US012634616B2

(12) United States Patent
Xu et al.

(10) Patent No.: US 12,634,616 B2
(45) **Date of Patent: *May 19, 2026**

(54) EARPHONES

(71) Applicant: SHENZHEN SHOKZ CO., LTD., Shenzhen (CN)

(72) Inventors: Jiang Xu, Shenzhen (CN); Zeying Zheng, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 208 days.

This patent is subject to a terminal disclaimer.

(21) Appl. No.: 18/420,730

(22) Filed: Jan. 23, 2024

(65) Prior Publication Data

US 2024/0171895 A1 May 23, 2024

Related U.S. Application Data

(63) Continuation of application No. 18/365,207, filed on Aug. 3, 2023, now Pat. No. 11,902,733, which is a (Continued)

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 1/10* (2006.01)

(52) U.S. Cl.
CPC ........... *H04R 1/105* (2013.01); *H04R 1/1008* (2013.01); *H04R 2460/09* (2013.01)

(58) Field of Classification Search
CPC ... H04R 1/105; H04R 1/1008; H04R 2460/09
See application file for complete search history.

(56) References Cited

U.S. PATENT DOCUMENTS

2002/0021800 A1* 2/2002 Bodley .................. H04M 1/05 379/430
2003/0044038 A1 3/2003 Shirata
(Continued)

FOREIGN PATENT DOCUMENTS

CN 210491148 U 5/2020
CN 212909891 U 4/2021
(Continued)

OTHER PUBLICATIONS

The Extended European Search Report in European Application No. 23881081.6 mailed on Jun. 2, 2025, 11 pages.

*Primary Examiner* — Suhan Ni
(74) *Attorney, Agent, or Firm* — METIS IP LLC

(57) ABSTRACT

The present disclosure relates to an earphone including a sound production component and an ear hook. In a wearing state, the ear hook is configured to place the sound production component at a position near an ear canal but not blocking the ear canal. An inner contour of a projection of the ear hook on the user's sagittal plane includes a first curve that has an extremum point in a first direction. The first direction is perpendicular to a long-axis direction of a projection of the sound production component. The extremum point is located behind a projection point of an upper vertex of the ear hook on the user's sagittal plane, and the upper vertex of the ear hook is the highest point of an inner contour of the ear hook along a vertical axis of the user.

20 Claims, 18 Drawing Sheets

Related U.S. Application Data continuation of application No. PCT/CN2023/083534, filed on Mar. 24, 2023.

(56) References Cited

U.S. PATENT DOCUMENTS

| | | | | |
|---|---|---|---|---|
| 2007/0009133 | A1 | 1/2007 | Gerkinsmeyer | |
| 2016/0050477 | A1* | 2/2016 | Ushakov ................ | H04R 1/105 381/380 |
| 2017/0034611 | A1 | 2/2017 | Maruyama | |
| 2019/0373385 | A1 | 12/2019 | Uchida et al. | |
| 2020/0196062 | A1 | 6/2020 | Zhang | |
| 2021/0014595 | A1* | 1/2021 | Li .......................... | H04R 31/00 |
| 2022/0007098 | A1 | 1/2022 | Chen et al. | |
| 2022/0095029 | A1 | 3/2022 | Zheng et al. | |
| 2022/0124428 | A1 | 4/2022 | Zheng et al. | |
| 2022/0386006 | A1 | 12/2022 | Meyberg Guzman et al. | |
| 2023/0130211 | A1 | 4/2023 | Li et al. | |

FOREIGN PATENT DOCUMENTS

| | | | |
|---|---|---|---|
| CN | 214014498 | U | 8/2021 |
| CN | 214125513 | U | 9/2021 |
| CN | 113573215 | A | 10/2021 |
| CN | 114286228 | A | 4/2022 |
| CN | 216357249 | U | 4/2022 |
| CN | 114513717 | A | 5/2022 |
| CN | 216649963 | U | 5/2022 |
| CN | 115175069 | A | 10/2022 |
| EP | 4181531 | A1 | 5/2023 |
| EP | 4475559 | A1 | 12/2024 |
| EP | 4489431 | A1 | 1/2025 |

* cited by examiner

EARPHONES

CROSS-REFERENCE TO RELATED APPLICATIONS

This application is a continuation of U.S. application Ser. No. 18/365,207, filed on Aug. 3, 2023, which is a continuation of International Application No. PCT/CN2023/083534, filed on Mar. 24, 2023, which claims priority to Chinese Patent Application No. 202211336918.4, filed on Oct. 28, 2022, Chinese Patent Application No. 202223239628.6 filed on Dec. 1, 2022, and International Application No. PCT/CN2022/144339, filed on Dec. 30, 2022, the entire contents of each of which are hereby incorporated by reference.

TECHNICAL FIELD

The present disclosure relates to the field of acoustics, and in particular, to earphones.

BACKGROUND

With the development of acoustic output technology, acoustic devices (e.g., headphones) have been widely used in people's daily lives, and can be used in conjunction with electronic devices such as cell phones and computers to provide users with an auditory feast. Acoustic devices can generally be classified into a head-mounted type, an ear-hook type, and an in-ear type according to the ways the users wear them. The output performance of the acoustic device, as well as the wearing comfort and stability may greatly affect the user's choice and experience.

Therefore, it is necessary to provide an earphone, which can improve the wearing comfort and the wearing stability of the earphone while ensuring the output performance of the earphone.

SUMMARY

Some embodiments of the present disclosure provide an earphone, comprising: a sound production component including a transducer and a housing for accommodating the transducer; and an ear hook. In a wearing state, a first part of the ear hook is hung between an auricle and a head of a user, and a second part of the ear hook extends towards a side of the auricle away from the head and connects to the sound production component to place the sound production component at a position near an ear canal but not blocking the ear canal. An inner contour of a projection of the ear hook on the user's sagittal plane includes a first curve, the first curve has an extremum point in a first direction, and the first direction is perpendicular to a long-axis direction of a projection of the sound production component. The extremum point is located behind a projection point of an upper vertex of the ear hook on the user's sagittal plane, and the upper vertex of the ear hook is the highest point of an inner contour of the ear hook along a vertical axis of the user in the wearing state.

Some embodiments of the present disclosure also provide an earphone, including a sound production component including a transducer and a housing for accommodating the transducer; and an ear hook. In a wearing state, a first part of the ear hook is hung between an auricle and a head of a user, and a second part of the ear hook extends towards a side of the auricle away from the head and connects to the sound production component to place the sound production component at a position near an ear canal but not blocking the ear canal. A projection of the ear hook on the user's sagittal plane has a first curve, the first curve has an extremum point in a first direction, and the first direction is perpendicular to a long-axis direction of a projection of the sound production component. The ear hook has a variable cross-section structure, and an area of a cross-section of the ear hook is the smallest near a corresponding point of the extremum point on the ear hook.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same numbers denote the same structures, wherein.

DETAILED DESCRIPTION

Figure 1:
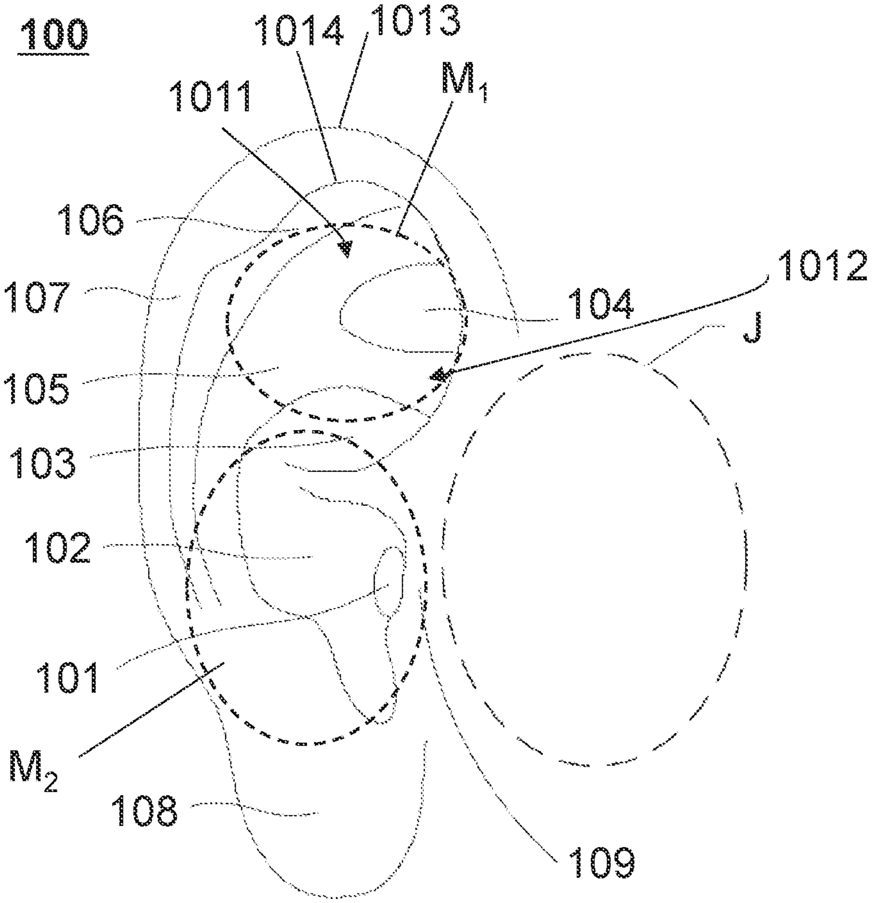
FIG. 1 is a schematic diagram illustrating an exemplary ear according to some embodiments of the present disclosure.

In order to more clearly illustrate the technical solutions of the embodiments of the present disclosure, the following will briefly introduce the drawings that need to be used in the description of the embodiments. Apparently, the accompanying drawings in the following description are only some examples or embodiments of the present disclosure, and those skilled in the art can also apply the present disclosure to other similar scenarios. Unless obviously obtained from the context or the context illustrates otherwise, the same numeral in the drawings refers to the same structure or operation.

It should be understood that the "system", "device", "unit" and/or "module" used in the present disclosure are a manner used to distinguish different components, elements, parts, portions, or assemblies of different levels. However, the words may be replaced by other expressions if other words can achieve the same purpose.

As shown in the present disclosure and the claims, unless the context clearly suggests exceptional circumstances, the words "a", "an" and/or "the" do not specifically refer to the singular, but may also include the plural. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

In the description of the present disclosure, it should be understood that the terms "first", "second", "third", "fourth", etc. are for the purpose of illustration only, and should not be understood as counts indicating or implying relative importance or implying the technical feature indicated. Thus, a feature defined with "first", "second", "third" and "fourth" may explicitly or implicitly include at least one of such features. In the description of the present disclosure, "plurality" means at least two, such as two, three, etc., unless otherwise specifically defined.

In the present disclosure, unless otherwise clearly specified and limited, terms such as "connection" and "fixation" should be interpreted in a broad sense. For example, the term "connection" refers to a fixed attachment, a detachable attachment, or in one piece; the "connection" may be a mechanical or electrical connection; the "connection" may be a direct connection, an indirect connection through an intermediary, an internal communication between two elements, or an interaction relationship between two elements, unless otherwise clearly defined. For those skilled in the art, the specific meanings of the above terms in the present disclosure may be understood according to specific situations.

The flowcharts used in the present disclosure illustrate operations that systems implement according to some embodiments of the present disclosure. It should be understood that the preceding or following operations are not necessarily performed in the exact order. Instead, various steps may be processed in reverse order or simultaneously. Moreover, one or more other operations may be added to the flowcharts. One or more operations may be removed from the flowcharts.

FIG. 1 is a schematic diagram illustrating an exemplary ear according to some embodiments of the present disclosure. As shown in FIG. 1, an ear 100 may include an external ear canal 101, an auricular concha cavity 102, a cymba of auricular concha 103, a triangular fossa 104, an antihelix 105, a scapha 106, a helix 107, an earlobe 108, a crus helix 109, an outer contour 1013, and an inner surface 1014. It should be noted that for illustration purposes, a superior crura of antihelix 1011, an inferior crura of antihelix 1012, and the antihelix 105 illustrated in the embodiments of the present disclosure are collectively referred to as an antihelix region. In some embodiments, one or more parts of the ear 100 may be used to achieve a stable wearing of an acoustic device. In some embodiments, parts of the ear 100 such as the external ear canal 101, the auricular concha cavity 102, the cymba of auricular concha 103, and the triangular fossa 104, etc., have a certain depth and volume in the three-dimensional space, which can be used to achieve a wearing requirement of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing of the acoustic device may be achieved with the aid of the cymba of auricular concha 103, the triangular fossa 104, the antihelix 105, the scapha 106, the helix 107, or the like, or a combination thereof. In some embodiments, in order to improve the comfort and reliability of the acoustic device in wearing, parts such as the earlobe 108, etc., of the user may further be used. By utilizing parts of the ear 100 other than the external ear canal 101 for the wearing of the acoustic device and the transmission of sound, the external ear canal 101 of the user may be "liberated," thereby reducing an impact of the acoustic device on the ear health of the user. When the user wears the acoustic device on the road, the acoustic device may not block the external ear canal 101 of the user, so that the user can receive both sounds from the acoustic device and sound from the environment (e.g., horn sounds, car bells, surrounding voices, traffic commands, etc.), thereby reducing the probability of traffic accidents. For example, when the user wears the acoustic device, the whole or part of a structure of the acoustic device may be located at a front side of the crus helix 109 (e.g., a region J enclosed by a dotted line in FIG. 1). As another example, when the user wears the acoustic device, the whole or part of the structure of the acoustic device may contact an upper portion of the external ear canal 101 (e.g., positions where one or more parts such as the crus helix 109, the cymba of auricular concha 103, the triangular fossa 104, the antihelix 105, the scapha 106, the helix 107, etc., are located). As another example, when the user wears the acoustic device, the whole or part of the structure of the acoustic device may be located in one or more parts of the ear (e.g., the auricular concha cavity 102, the cymba of auricular concha 103, the triangular fossa 104, etc.) (e.g., a region M1 enclosed by a dotted line in FIG. 1 containing at least the cymba of auricular concha 103 and the triangular fossa 104 and a region M2 containing at least the auricular concha cavity 102).

Different users may have individual differences, resulting in different shapes, dimensions, etc., of the ear 100. For ease of description and understanding, if not otherwise specified, the present disclosure primarily uses a "standard" shape and dimension ear model as a reference and further describes the wearing manners of the acoustic device in different embodiments on the ear model. For example, a simulator (e.g., GRAS 45BC KEMAR) containing a head and (left and right) ears produced based on standards of ANSI: S3.36, S3.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Certainly, considering the individual differences of different users, structures, shapes, sizes, thicknesses, etc., of one or more parts of the ear 100 may take a differentiated design according to the ears 100 of different shapes and sizes, and the differentiated design may be manifested as values of feature parameters of one or more parts of the acoustic device (e.g., a sound production component, an ear hook, etc., hereinafter) may be within different ranges to fit different ears 100. In addition, it should be noted that the "non-wearing state" is not limited to a state that the earphone is not worn on the ear 100 of the user, but also includes a state that the earphone is not subjected to an external force to be deformed; the "wearing state" is not limited to a state in which the earphone is worn on the ear 100 of the user, and a state that a suspension structure (e.g., the ear hook) and the sound production component are positioned at a corresponding distance may also be regarded as the wearing state.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane refers to a section perpendicular to the ground along a front and rear direction of the body, which divides the human body into left and right parts. The coronal plane refers to a section perpendicular to the ground along a left and right direction of the body, which divides the human body into front and rear parts. The horizontal plane refers to a section parallel to the ground along an up-and-down direction of the body, which divides the human body into upper and lower parts. Correspondingly, the sagittal axis refers to an axis along the front-and-rear direction of the body and perpendicular to the coronal plane. The coronal axis refers to an axis along the left-and-right direction of the body and perpendicular to the sagittal plane. The vertical axis refers to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head, and both are in reference to the ear of the user. In this case, observing the ear of the above simulator in a direction along the coronal axis of the human body, a schematic diagram illustrating the front side of the ear as shown in FIG. 1 is obtained.

The above description of the ear 100 is for illustration purposes only and is not intended to limit the scope of the present disclosure. Those skilled in the art may make various changes and modifications based on the description of the present disclosure. For example, part of the structure of the acoustic device may cover the portion or whole of the external ear canal 101. These changes and modifications are still within the protection scope of the present disclosure.

Figure 2:
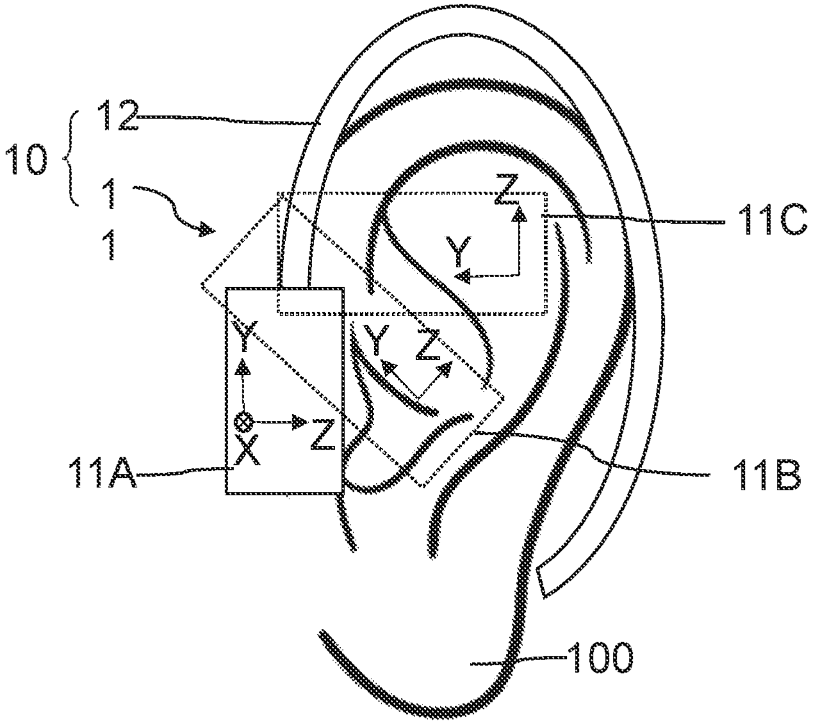
FIG. 2 is a diagram illustrating an exemplary structure of an earphone according to some embodiments of the present disclosure.

FIG. 2 is a diagram illustrating an exemplary structure of an earphone according to some embodiments of the present disclosure. As shown in FIG. 2, an earphone 10 may include a sound production component 11 and an ear hook 12, and the sound production component 11 includes a housing and a transducer disposed in the housing. In some embodiments, the sound production component 11 of the earphone 10 may be worn on the user's body (e.g., the head, the neck, or an upper torso of a human body) through the ear hook 12, while ensuring the housing and the transducer of the sound production component 11 be close to the ear canal without blocking it, so that the ear 100 of the user remains open. In such cases, the user can receive not only a sound output from the earphone 10 but also a sound from an external environment. For example, the earphone 10 may be arranged around or partially around the ear 100 of the user and may propagate a sound through an air conduction or bone conduction manner.

In some embodiments, the housing may be worn on the user's body and carry the transducer. In some embodiments, the housing may be a closed housing structure with a hollow interior, and the transducer is located inside the housing. In some embodiments, the earphone 10 may be combined with products such as glasses, a headset, a head-mounted display device, an AR/VR headset, etc. In such cases, the housing may be placed near the user's ear 100 in a hanging or clamping manner. In some alternative embodiments, a suspension structure (e.g., a hook) may be provided on the housing. For example, the shape of the hook matches the shape of the auricle, and the earphone 10 may be independently worn on the ear 100 of the user through the hook.

In some embodiments, the housing may be a housing structure having a shape suitable for the human ear 100, for example, circular, elliptical, polygonal (which is regular or irregular), U-shaped, V-shaped, semicircular, etc., so that the housing can be directly hung on the ear 100 of the user. In some embodiments, the housing may also include a fixed structure. The fixed structure may include an ear hook, an elastic band, etc., so that the earphone 10 can be better worn on the user's body to prevent falling during using.

In some embodiments, when the user wears the earphone 10, the sound production component 11 may be located on an upper side, a lower side, or a front side (e.g., a region J on a front side of a tragus shown in FIG. 1) of the user's ear 100, or inside the auricle (e.g., a region M where an auricular concha cavity is located). Two or more acoustic holes (such as a sound inlet and a pressure relief hole) for propagating sound may also be set on the sound production component 11. In some embodiments, the transducer in the sound production component 11 may output sounds with a phase difference (e.g., phase opposite) through the two or more acoustic holes.

In some embodiments, the transducer may include a vibration diaphragm. When the vibration diaphragm vibrates, sounds may be emitted from a front side and a rear side of the vibration diaphragm. In some embodiments, a front chamber (not shown) for sound transmission is set at the front side of the vibration diaphragm in the housing. The front chamber is acoustically coupled with an acoustic hole (such as the sound inlet), and the sound at the front side of the vibration diaphragm may be emitted from the sound inlet through the front chamber. A rear side (not shown) for sound transmission is set at the rear side of the vibration diaphragm in the housing. The rear side is acoustically coupled with another acoustic hole (such as the pressure relief hole), and the sound at the rear side of the vibration diaphragm may be emitted from the pressure relief hole through the rear chamber. In some embodiments, a core may include a core housing (which is not shown), and the core housing and the vibration diaphragm of the transducer are defined as the front chamber and the rear chamber of the transducer. It needs to be understood that when the vibration diaphragm is vibrating, the front side and the rear side of the vibration diaphragm may simultaneously produce a set of sounds with a phase difference (e.g., phase opposite). When the sound passes through the front chamber and the rear chamber respectively, the sound may propagate outward from the sound inlet acoustically coupled with the front chamber and the pressure relief hole acoustically coupled with the rear chamber. In some embodiments, by setting structures of the front chamber and the rear chamber, the sounds output by the transducer at the sound inlet and the pressure relief hole may satisfy a specific condition. For example, lengths of the front chamber and the rear chamber may be set so that a set of sounds with a specific phase relationship (e.g., phase opposite) may be output from the sound inlet and the pressure relief hole.

Figure 3:
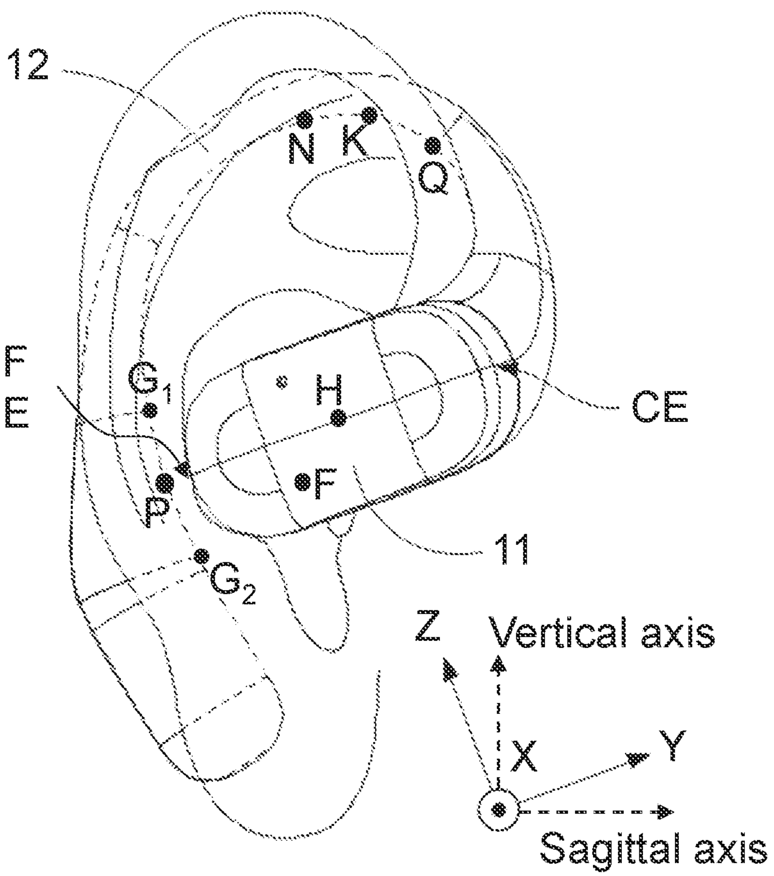
FIG. 3 is a schematic diagram illustrating an exemplary wearing manner of an earphone according to some embodiments of the present disclosure.

FIG. 3 is a schematic diagram illustrating an exemplary wearing manner of an earphone according to some embodiments of the present disclosure. Referring to FIG. 2 and FIG. 3, FIG. 2 shows a left ear, FIG. 3 shows a right ear, and 11A, 11B and 11C in FIG. 2 represent schematic diagrams of different positions of the sound production component 11 in a wearing state. In some embodiments, the sound production component 11 may have a long-axis direction Y and a short-axis direction Z that are perpendicular to a thickness direction X and orthogonal to each other. The long-axis direction Y may be defined as a direction having the largest extension size in a shape of a two-dimensional projection plane (e.g., a projection of the sound production component 11 on a plane where its outer side surface OS is located, or a projection on a sagittal plane) of the sound production component 11. For example, when a shape of the projection is rectangular or approximately rectangular, the long-axis direction is a length direction of the rectangle or approximately rectangular. The short-axis direction Z may be defined as a direction perpendicular to the long-axis direction Y in the shape of the projection of the sound production component 11 on the sagittal plane (e.g., when the shape of the projection is rectangular or approximately rectangular, the short-axis direction is a width direction of the rectangle or approximate rectangle). The thickness direction X may be defined as a direction perpendicular to the two-dimensional projection plane, for example, in the same direction as a coronal axis, both pointing to the left-and-right side of the body. In some embodiments, when the sound production component 11 is in a horizontal state (as shown by 11C in FIG. 2) in the wearing state, the long-axis direction Y may be consistent with a direction of a sagittal axis, which indicates a front and rear direction of the body, and the short-axis direction Z may be consistent with a direction of a vertical axis, which indicates an up and down direction of the body. As shown in FIG. 2 and FIG. 3, when the earphone 10 is in the wearing state, the thickness direction X is a direction perpendicular to the paper. In some embodiments, when the sound production component 11 is in a tilted state in the wearing state, the long-axis direction Y and the short-axis direction Z are still parallel or approximately parallel to the sagittal plane, a certain included angle may be formed between the long-axis direction Y and the sagittal axis direction, that is, the long-axis direction Y may be set to be tilted, and a certain included angle may be formed between the short-axis direction Z and the direction of the vertical axis, that is, the short-axis direction Z may also be set to be tilted, such as a tilted state of a sound production component 11B in FIG. 2, a tilted state of a sound production component 11 in FIG. 3, and a vertical state of the sound production component 11A in FIG. 2.

Figure 10A:
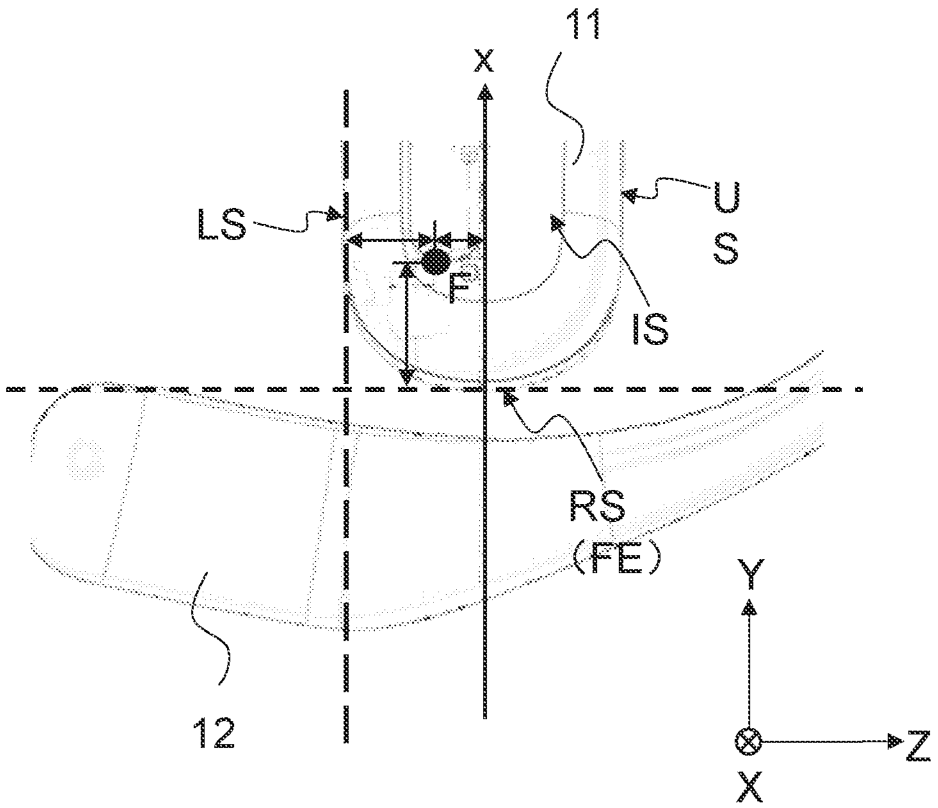
FIG. 10A and FIG. 10B are schematic diagrams illustrating an exemplary position structure of a centroid of an earphone according to some embodiments of the present disclosure.
Figure 10B:
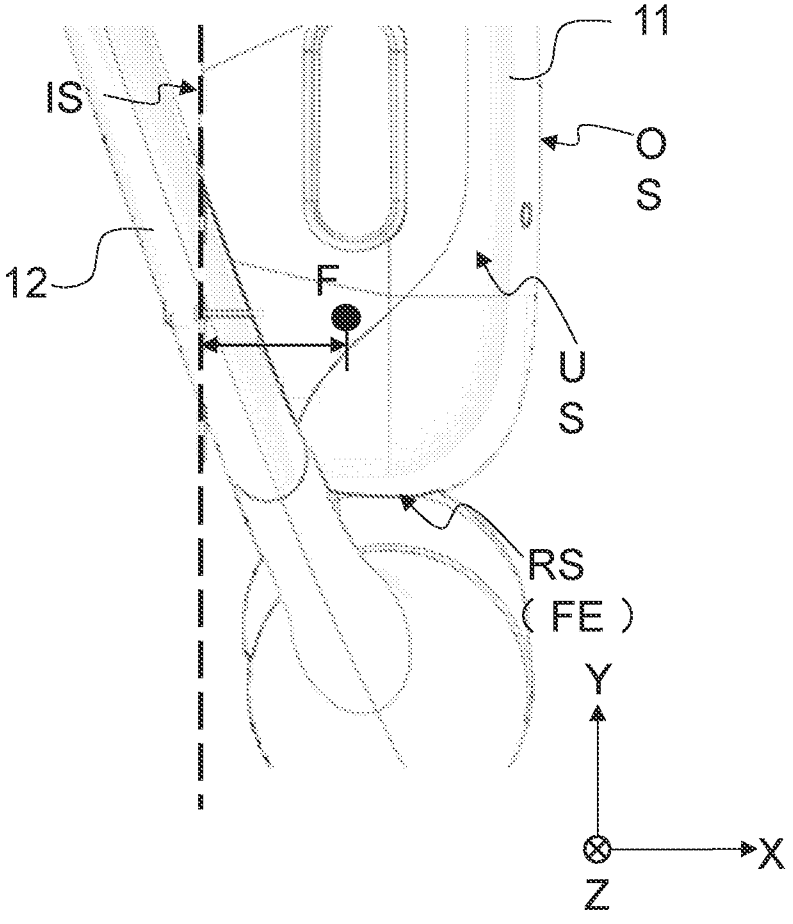

In some embodiments, as shown in FIG. 10A and FIG. 10B, the sound production component 11 may have an inner side surface IS facing the ear along the thickness direction X, an outer side surface OS facing away from the ear in the wearing state, and a connection surface connecting the inner side surface IS and the outer side surface OS. It should be noted that in the wearing state, when viewed along the direction of the coronal axis (i.e., the thickness direction X), the sound production component 11 may be set in a shape such as a circle, an ellipse, a rounded square, a rounded rectangle, etc. When the sound production component 11 is provided in the shape of a circle, an ellipse, etc., the above-mentioned connection surface may refer to an arc-shaped side surface of the sound production component 11; and when the sound production component 11 is set in the shape of a rounded square, a rounded rectangle, etc., the above-mentioned connection surface may include a lower side surface LS, an upper side surface US, and a rear side surface RS as mentioned later. Therefore, for the convenience of description, this embodiment is exemplarily illustrated with the sound production component 11 set in a rounded rectangle. The length of the sound production component 11 in the long-axis direction Y may be greater than the width of the sound production component 11 in the short-axis direction Z. As shown in FIG. 3, the sound production component 11 may have an upper side surface US facing away from the external ear canal 101 along the short-axis direction Z, a lower side surface LS facing the external ear canal 101 in the wearing state, and a rear side surface RS connecting the upper side surface US and the lower side surface LS. The rear side surface RS is located at an end of the long-axis direction Y towards the back of the head in the wearing state and is at least partially located in the auricular concha cavity 102. A free end FE of the sound production component 11 is set on the rear side surface RS.

In some embodiments, the whole or part of the housing of the sound production component 11B may be inserted into the auricular concha cavity 102, that is, a projection of the housing of the sound production component 11B on the sagittal plane and a projection of the auricular concha cavity 102 on the sagittal plane have an overlapping part. More details about the sound production component 11B may be found elsewhere in the present disclosure, such as FIG. 3 and the related descriptions thereof. In some embodiments, the sound production component 11 may be in a horizontal or approximately horizontal state in the wearing state, which is illustrated as the sound production component 11C shown in FIG. 2. The long-axis direction Y may be consistent with or approximately consistent with the sagittal axis direction, which indicates the front and rear direction of the body. The short-axis direction Z may be consistent with or approximately consistent with the vertical axis direction, which indicates the up and down direction of the body. It should be noted that, in the wearing state, the sound production component 11C in the approximately horizontal state indicates that an included angle between the long-axis direction of the sound production component 11C and the sagittal direction is within a specific range (e.g., not greater than 20°). In addition, a wearing position of the sound production component 11 may be not limited to the sound production component 11A, the sound production component 11B, and the sound production component 11C shown in FIG. 2 as long as it satisfies the region J, the region M1, or the region M2 shown in FIG. 1. For example, the whole or part of the structure of the sound production component 11 may be located at a front side of the crus helix 109 (e.g., the region J surrounded by a dotted line in FIG. 1). As another example, the whole or part of the structure of the sound production component 11 may contact an upper portion of the external ear canal 101 (e.g., positions where one or more parts such as the crus helix 109, the cymba of auricular concha 103, the triangular fossa 104, the antihelix 105, the scapha 106, the helix 107, etc., are located). As another example, the whole or part of the structure of the sound production component 11 may be located in a cavity (e.g., the region M1 enclosed by a dotted line in FIG. 1 containing at least the cymba of auricular concha 103 and the triangular fossa 104 and the region M2 containing at least the auricular concha cavity 102) formed by one or more parts of the ear 100 (e.g., the auricular concha cavity 102, the cymba of auricular concha 103, the triangular fossa 104, etc.).

Figure 4:
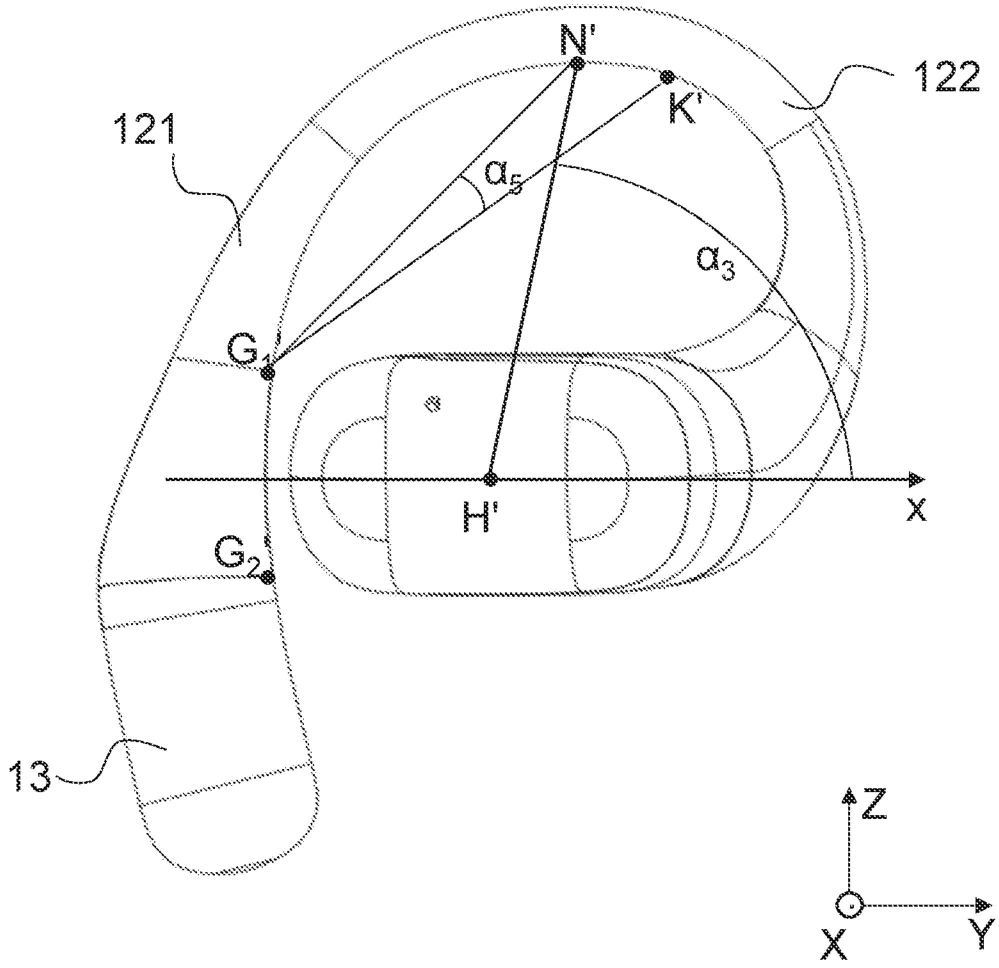
FIG. 4 is a schematic diagram illustrating an exemplary projection of an earphone on the user's sagittal plane according to some embodiments of the present disclosure.

FIG. 4 is a schematic diagram illustrating an exemplary projection of an earphone on the user's sagittal plane according to some embodiments of the present disclosure. In some embodiments, in a wearing state, a first part 121 of the ear hook 12 is hung between an auricle and a head of a user, and a second part 122 extends to a side of the auricle away from the head and connects to the sound production component 11, so that the sound production component 11 may be placed near an ear canal but not blocking the earhole.

In some embodiments, the first part 121 of the ear hook 12 includes a battery compartment 13. A battery connected to the sound production component 11 is arranged in the battery compartment 13. In some embodiments, the battery compartment 13 is located at an end of the first part 121 away from the sound production component 11, and a projection contour of an end of the ear hook 12 away from the sound production component 11 is a projection contour of a free end of the battery compartment 13 on the user's sagittal plane. In some embodiments, when the user wears the earphone 10, the sound production component 11 and the battery compartment 13 may be located respectively on a front side and a rear side of the auricle.

In some embodiments, in order to improve the stability of the earphone 10 in the wearing state, the earphone 10 may be arranged in any one of the following manners or a combination thereof through setting a specific shape and a specific size of the ear hook 12. First, at least a portion of the ear hook 12 is provided as a mimic structure that fits against at least one of the rear side of the ear 100 and the head to increase a contact area of the ear hook 12 with the ear 100 and/or the head, thereby increasing the resistance of the earphone 10 to fall off from the ear 100. Second, at least a portion of the ear hook 12 is provided with an elastic structure so that it has a certain degree of deformation in the wearing state to increase a positive pressure of the ear hook 12 on the ear and/or the head, thereby increasing the resistance of the earphone 10 to fall off from the ear. Third, the ear hook 12 is at least partially set to lean against the head in the wearing state, so that it forms a reaction force to press the ear to enable the sound production component 11 to be pressed on the front side of the ear, thereby increasing the resistance of the earphone 10 to fall off from the ear. Fourth, the sound production component 11 and the ear hook 12 are set to clamp a region where the helix is located, a region where the inferior concha is located, etc., from the front and rear sides of the ear in the wearing state, so as to increase the resistance of the earphone 10 to fall off from the ear. Fifth, the sound production component 11 or an auxiliary structure connected thereto is set to extend at least partially into cavities such as the inferior concha, the concha boat, the triangular fossa, and the scapha, so as to increase the resistance of the earphone 10 to falling off from the ear.

As shown in FIG. 3, in some embodiments, the sound production component 11 has a fixed end CE connected to the ear hook 12 and a free end FE not connected to the ear hook 12. As an example, as shown in FIG. 3, in the wearing state, the free end FE of the sound production component 11 may be inserted into the auricular concha cavity. The sound production component 11 and the ear hook 12 may be arranged to clamp an ear region mentioned above from a front side and a rear side of the ear region corresponding to the auricular concha cavity, thereby increasing the falling resistance of the earphone 10 from the ear, and further improving the reliability of the earphone 10 in the wearing state. For example, the free end FE is pressed in the auricular concha cavity in the thickness direction X. As another example, the free end FE abuts against the auricular concha cavity in the long-axis direction Y and the short-axis direction Z.

It should be noted that in the wearing state, the free end FE of the sound production component 11 may not only be inserted into the auricular concha cavity, but also be projected orthogonally onto the antihelix, and may also be projected orthogonally onto the left side or the right side of the head and be located at a front side of the ear along the sagittal axis of the human body. In other words, the ear hook 12 may support the sound production component 11 to be worn to wearing positions such as the auricular concha cavity, the antihelix, the front side of the ear, etc.

The following takes the earphone 10 shown in FIG. 3 as an example to describe the earphone 10 in detail. It should be known that, without violating a corresponding acoustic principle, the structure and a corresponding parameter of the earphone 10 in FIG. 3 may also be applicable to earphones of other structures mentioned above.

By at least partially inserting the sound production component 11 into the auricular concha cavity 102, a listening volume of a listening position (e.g., the earhole), especially the listening volume with middle and low frequencies may be increased, while still maintaining a good effect of far-field leakage cancellation. Merely by way of example, when the whole or part of the structure of the sound production component 11 is inserted into the auricular concha cavity 102, the sound production component 11 and the auricular concha cavity 102 may form a structure similar to a cavity (which is referred to as a cavity-like entity hereinafter). In the embodiments of the present disclosure, the cavity-like entity may be understood as a semi-closed structure enclosed by a sidewall of the sound production component 11 and the auricular concha cavity 102. The semi-closed structure may ensure that an inner environment is not completely closed and isolated from an outer environment, but have a leaking structure (e.g., an opening, a gap, a pipeline, etc.) acoustically communication with the outer environment. When the user wears the earphone 10, one or more sound inlets may be provided on the housing of the sound production component 11 close to or facing the ear canal of the user, and one or more pressure relief holes are arranged on one or more other sidewalls (e.g., a sidewall far away or deviated from the ear canal of the user) of the housing of the sound production component 11. The sound inlets are acoustically coupled with a front chamber of the earphone 10, and the pressure relief holes are acoustically coupled with a rear chamber of the earphone 10. Taking the sound production component 11 including a sound inlet and a pressure relief hole as an example, a sound output from the sound inlet and a sound output from the pressure relief hole may be approximately regarded as two sound sources, and sound waves of the two sound sources are in opposite phases. The sound production component 11 and an inner wall corresponding to the auricular concha cavity 102 may form a cavity-like structure. A sound source corresponding to the sound inlet is located in the cavity-like structure, and a sound source corresponding to the pressure relief hole is located outside the cavity-like structure to form an acoustic model shown in FIG. 5.

Figure 5:
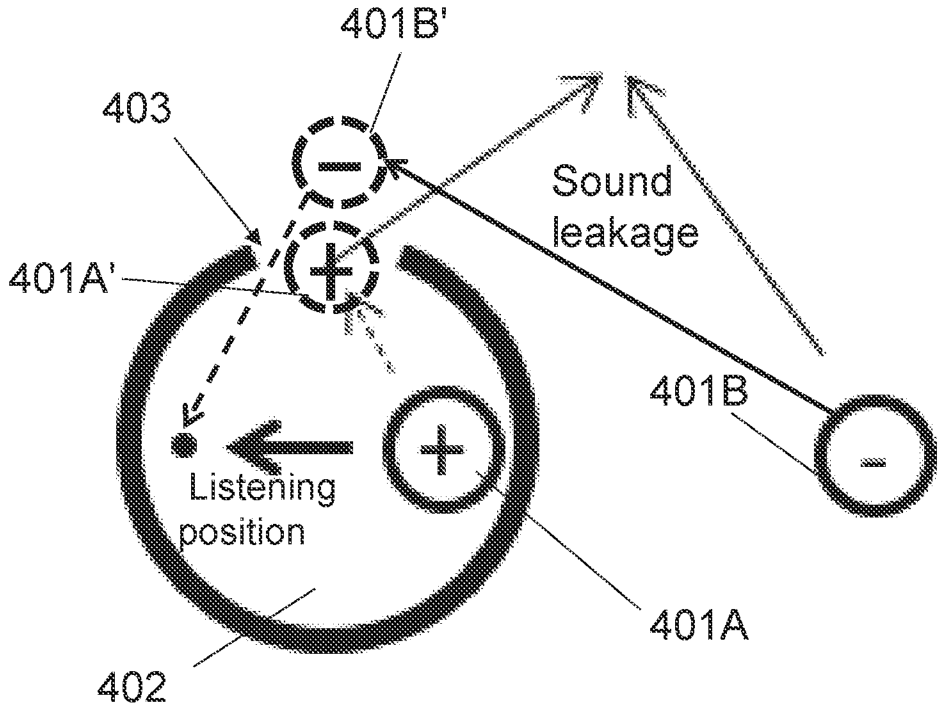
FIG. 5 is a distribution schematic diagram illustrating a cavity structure arranged around one of two sound sources according to some embodiments of the present disclosure.

FIG. 5 is a distribution schematic diagram illustrating a cavity structure arranged around one of two sound sources according to some embodiments of the present disclosure. As shown in FIG. 5, a cavity-like structure 402 may include a listening position and at least one sound source 401A. The word "include" herein may indicate that at least one of the listening position and the sound source 401A is located in the cavity-like structure 402, or at least one of the listening position and the sound source 401A is located at an inner edge of the cavity-like structure 402. The listening position may be equivalent to an entrance of the ear canal, or an acoustic reference point of the ear, such as an ear reference point (ERP), an ear-drum reference point (DRP), etc., or may be an entrance structure conducted to a listener, etc. Since the sound source 401A is surrounded by the cavity-like structure 402, most of the sounds emitted from the sound source 401A may reach the listening position through a direct radiation or reflection manner. In contrast, without the cavity-like structure 402, most of the sounds emitted from the sound source 401A may not reach the listening position. Therefore, the arrangement of the cavity-like structure significantly increases the sound volume reaching the listening position. At the same time, only a minor part of sounds with an opposite phase emitted from the sound source 401B with an opposite phase located at the outside of the cavity-like structure 402 can enter the cavity-like structure 402 through a leaking structure 403 of the cavity-like structure 402, which is equivalent to a secondary sound source 401B' generated at the leaking structure 403. An intensity of the secondary sound source 401B' is significantly smaller than an intensity of the sound source 401B, and also significantly smaller than an intensity of the sound source 401A. The sound emitted from the secondary sound source 401B' has a weak reverse-phase cancellation effect on the sound source 401A in the cavity, so that the listening volume at the listening position is significantly increased. For the sound leakage, the sound source 401A radiates a sound to the outside through the leaking structure 403 of the cavity is equivalent to generating a secondary sound source 401A' at the leaking structure 403. Since almost all sounds emitted from the sound source 401A are output through the leaking structure 403, and a size of the cavity-like structure 402 is much smaller than a space size for evaluating the sound leakage (a difference with at least one order of magnitude), therefore an intensity of the secondary sound source 401A' can be considered as comparable to that of the sound source 401A. For the external space, the secondary sound source 401A' and the sound source 401B may form a double-point sound source, so that sounds produced by them cancel each other out, thereby reducing sound leakage.

In a specific application scenario, an outer wall surface of the housing of the sound production component 11 may usually be a plane surface or a curve surface, and a contour of the auricular concha cavity may be an uneven structure. By inserting the whole or part of the structure of the sound production component 11 into the auricular concha cavity, a cavity-like structure that is in communication with the outside may be formed between the sound production component 11 and the contour of the auricular concha cavity. Furthermore, the acoustic model shown in FIG. 5 may be formed by arranging the sound inlet at a position of the housing of the sound production component 11 facing the ear canal of the user and close to an edge of the auricular concha cavity 102 (e.g., the inner side surface IS) and arranging the pressure relief hole at a position of the sound production component 11 deviated from or far away from the earhole, thereby increasing the listening volume at the earhole of the user when the user wears the earphone and reducing the far-field leakage sound.

In some embodiments, by designing a shape and a size of the ear hook 12, the compatibility of the ear hook 12 with an ear of the user may be improved, and the stability and adjustability of the earphone 10 may be improved. Additionally, the ear hook 12 may be adjusted to place the sound production component 11 at a specific position on the ear of the user, thereby improving the sound effect of the earphone 10.

In order to understand and describe the shape of the earphone 10 in a non-wearing state or in a wearing state, the earphone 10 may be projected onto a specific plane, and the earphone 10 may be described by parameters related to a projection shape on the plane. Merely by way of example, in the wearing state, the earphone 10 may be projected on the sagittal plane of the human body to form a corresponding projection shape. In the non-wearing state, with reference to a relative positional relationship between the sagittal plane of the human body and the earphone 10, a first plane similar to this may be selected, so that a projection shape formed by the earphone 10 projected on the first plane is close to a projection shape of the earphone 10 on the sagittal plane of the human body. The first plane may be determined in the following manner: the ear hook 12 can be placed on a flat support plane (such as a horizontal desktop, a ground plane, etc.), and when the ear hook 12 is in contact with the support plane and placed stably, the support plane is the first plane corresponds to the earphone 10. Certainly, in order to maintain the uniformity of the specific plane corresponding to the wearing state and the non-wearing state, the first plane may also be the sagittal plane of the human body. In some embodiments, the first plane also refers to a plane formed by a bisector that bisects or approximately bisects the ear hook 12 along a direction in which the ear hook 12 extends its length.

Figure 6:
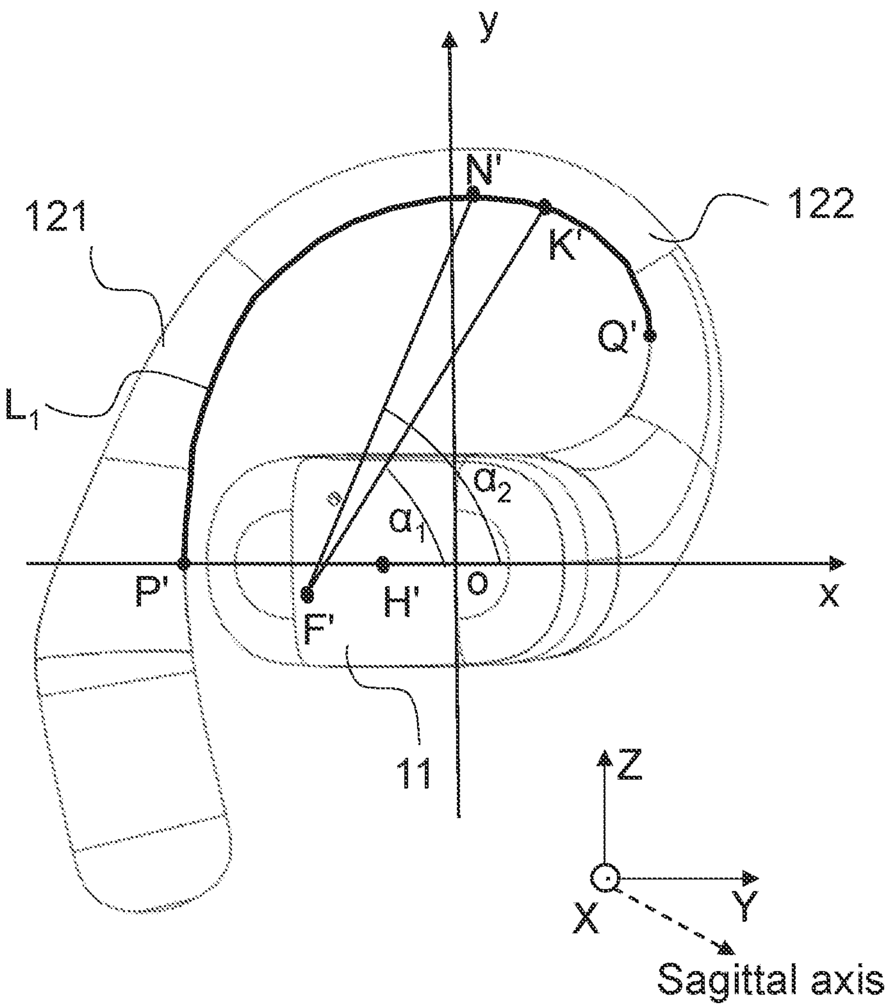
FIG. 6 is a schematic diagram illustrating an exemplary first curve of a projection of an earphone on the user's sagittal plane according to some embodiments of the present disclosure.

FIG. 6 is a schematic diagram illustrating an exemplary first curve of a projection of an earphone on the user's sagittal plane according to some embodiments of the present disclosure. In some embodiments, as shown in FIG. 6, a first curve L1 in a projection of the ear hook 12 on the user's sagittal plane may be designated as a reference curve of the ear hook 12. In some embodiments, since the earphone 10 is in the wearing state, a region where the ear hook 12 is in contact with an ear of a user is mainly an inner contour of the ear hook 12, so that the first curve L1 may be a reference curve corresponding to an inner contour of the projection of the ear hook 12 on the user's sagittal plane. In some embodiments, in a long-axis direction Y of a projection of the sound production component 11, a curve corresponds to the inner contour of the projection of the ear hook 12 on the user's sagittal plane has a leftmost end (point P') and a rightmost end (point Q'). A part of a curve of the inner contour of the projection of the ear hook 12 on the user's sagittal plane between point P' and point Q' is the first curve L1. As shown in FIG. 3, an actual position corresponding to point P' on the ear hook 12 is point P, and an actual position corresponding to point Q' on the ear hook 12 is point Q. By designing features (such as an extremum point, etc.) of the first curve L1, a shape and a size of the ear hook 12 may be determined, thereby improving the compatibility between the ear hook 12 and the ear of the user and improving the stability and adjustability of the earphone 10. On the other hand, the ear hook 12 may be adjusted to place the sound production component 11 on a specific position of the ear of the user, so as to improve the sound effect of the earphone 10.

As shown in FIG. 6, in some embodiments, to establish a first rectangular coordinate system xoy, the long-axis direction Y of the projection of the sound production component 11 on the sagittal plane may be designated as an x-axis, a direction perpendicular to the x-axis is a y-axis, and an intersection of the x-axis and the y-axis may be designated as an origin o. The first curve L1 may be regarded as a curve in the first rectangular coordinate system xoy.

In some embodiments, the y-axis direction may be referred to as a first direction, that is, the first direction is perpendicular to the long-axis direction Y of the projection of the sound production component 11 on the user's sagittal plane, and faces a direction of the top of the head of the user. In some embodiments, in the first rectangular coordinate system xoy, the first curve L1 has an extremum point N' in the first direction. A positional relationship among the extremum point N', the ear hook 12, and other position points on the sound production component 11 may be set to adjust a wearing condition (e.g., a mechanical parameter when wearing and a position of the sound production component 11 relative to the ear when wearing) of the earphone 10. As shown in FIG. 3, FIG. 4, and FIG. 6, in some embodiments, the extremum point N' is located on a rear side of an upper vertex K (which is represented by a projection point K' of the upper vertex K on the user's sagittal plane) on the ear hook 12. That is, on the projection of the ear hook 12 in the user's sagittal plane, compared with the projection point K' of the upper vertex K, the position of the extremum point N' is closer to the back of the head of the user.

In some embodiments, as shown in FIG. 3, the upper vertex K of the ear hook 12 may be the highest point of the inner contour of the ear hook 12 along a vertical axis of the user in the wearing state. In some embodiments, when the user wears the earphone 10, the ear 100 may support the earphone 10 mainly through the upper vertex K of the ear hook 12. In some embodiments, as shown in FIG. 3, FIG. 4, and FIG. 6, the upper vertex K of the ear hook 12 may be a position where the inner contour of the ear hook 12 with the largest bending degree in the wearing state. In some embodiments, as shown in FIG. 3, FIG. 4, and FIG. 6, in the wearing state, the upper vertex K of the ear hook 12 may be a point on the inner contour of the ear hook 12 that is farthest from an end of the ear hook 12 (i.e., an end of the first part 121, a free end of the battery compartment 13, and an end of the ear hook 12 that is not in contact with the sound production component 11). In some embodiments, a position of the upper vertex K of the ear hook 12 may simultaneously satisfy one or more of the three positions mentioned above.

In some embodiments, as shown in FIG. 3, a corresponding point of the extremum point N' on the ear hook 12 is point N. In some embodiments, an included angle between an ear hook plane of the ear hook 12 (such as a plane S1 in FIG. 11) and the user's sagittal plane may be considered comprehensively to determine the corresponding point N of the extremum point N' on the ear hook 12. In some embodiments, in the wearing state, the ear hook plane may be parallel to the user's sagittal plane.

As shown in FIG. 3, in the wearing state, the sound production component 11 needs to be inserted into the auricular concha cavity. A distance between the extremum point N of the ear hook and the upper vertex K in the long-axis direction Y of the sound production component 11 may affect a degree to which the sound production component 11 inserts into the auricular concha cavity and a facing direction of the sound production component 11 in the auricular concha cavity, thereby affecting a cavity-like structure formed by inserting the sound production component 11 into the auricular concha cavity.

When the distance between the extremum point N of the ear hook 12 and the upper vertex K in the long-axis direction Y of the sound production component 11 is too large, the compatibility between the first part 121 of the ear hook 12 and the ear 100 may deteriorate and the stability of wearing the earphone 10 may be decreased, or cause the facing direction (i.e., the long-axis direction Y) of the sound production component 11 in the auricular concha cavity 102 too close to the vertical axis, and a gap between the upper side surface US of the sound production component 11 and the auricular concha cavity is too large, that is, an opening of the formed cavity-like entity is too large, thus the contained sound source (i.e., a sound inlet on the inner side surface IS) directly emits more sound components to the environment, and a sound reaching a listening position is relatively low, at the same time, a sound from an external sound source entering the cavity-like entity may increase, causing the near-field sound cancellation, which leads to a poor sound effect.

When the distance between the extremum point N of the ear hook and the upper vertex K in the long-axis direction Y of the sound production component 11 is too small, an included angle between the facing direction (e.g., the long-axis direction Y) of the sound production component 11 in the auricular concha cavity and the vertical axis may be too large, and the gap between the upper side surface US of the sound production component 11 and the auricular concha cavity is too small or a count of gaps is too few, causing the opening of the formed cavity-like entity to be too small or too few, which may lead to a poor effect on sound leakage reduction. In addition, when the distance mentioned above is too small, the upper side surface US of the sound production component 11 may abut against an inner wall of the auricular concha cavity, and may even excessively press the auricular concha cavity of the user, making the user feel uncomfortable and affecting the wearing comfort of the earphone 10.

As shown in FIG. 3 and FIG. 6, in some embodiments, on the projection of the ear hook 12 on the user's sagittal plane, along the long-axis direction Y of the sound production component 11, a distance between the extremum point N' and a projection point of the upper vertex K may be within a range of 6 mm-15 mm. In some embodiments, since the x-axis is parallel to the long-axis direction Y of the sound production component 11, the distance between the extremum point N' and the projection point K' of the upper vertex K along the long-axis direction Y of the projection of the sound production component 11 may be a distance between an abscissa of the extremum point N' and an abscissa of the projection point K' of the upper vertex K. In some embodiments, in order to obtain a better sound effect, along the long-axis direction Y of the projection of the sound production component 11, a distance between the extremum point N' and the projection point K of the upper vertex K on the ear hook 12 on the user's sagittal plane may be within a range of 7 mm-12 mm. In some embodiments, in order to further improve the effect on sound leakage reduction, along the long-axis direction Y of the projection of the sound production component 11, the distance between the extremum point N' and the projection point K' of the upper vertex K on the ear hook 12 on the user's sagittal plane may be within a range of 8 mm-11 mm.

It should be noted that a method for measuring a relevant distance and angle of the projection of the earphone 10 on the user's sagittal plane may include: taking a picture parallel to the projection plane (the user's sagittal plane); measuring a relevant distance and angle on the photo, and then converting according to a scale of the photo to obtain actual data of the relevant distance and angle on the projection.

In some embodiments, in addition to reflecting the distance between the extremum point N of the ear hook and the upper vertex K through the distance of the projection points mentioned above, an actual measurement can also be carried out on the ear hook 12. In some embodiments, the distance between the extremum point N of the ear hook and the upper vertex K may be within a range of 6 mm-12 mm. In some embodiments, in order to further improve the effect on sound leakage reduction, on the ear hook 12, the distance between the extremum point N of the ear hook and the upper vertex K may be within a range of 7 mm-11 mm. In some embodiments, in order to make the cavity-like structure formed by the sound production component 11 and the auricular concha cavity have a more suitable volume and opening size/count, on the ear hook 12, the distance between the extremum point N of the ear hook and the upper vertex K may be within a range of 8 mm-11 mm.

Figure 7:
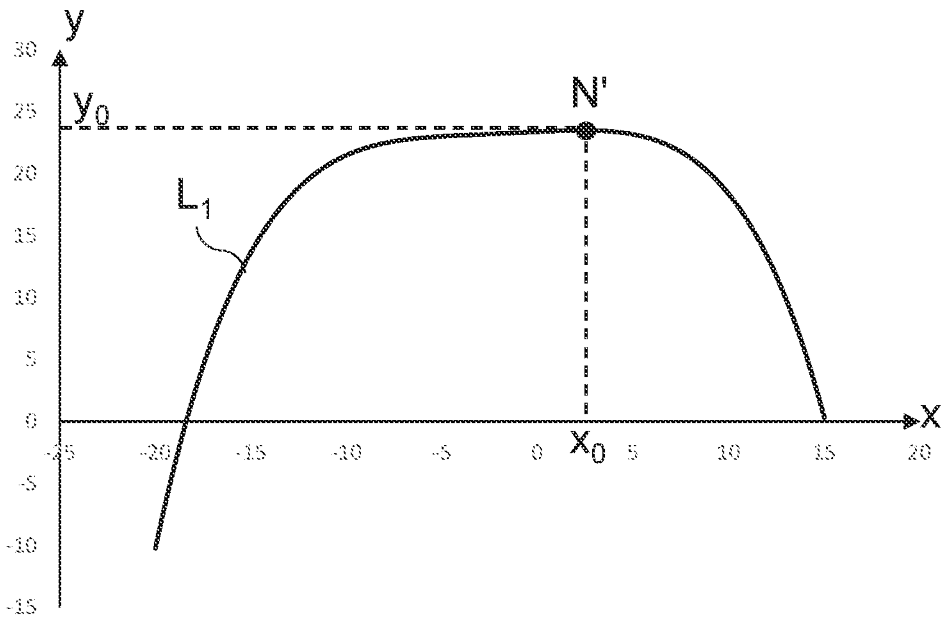
FIG. 7 is a schematic diagram illustrating an exemplary fitting function curve of a first curve according to some embodiments of the present disclosure.

FIG. 7 is a schematic diagram illustrating an exemplary fitting function curve of a first curve according to some embodiments of the present disclosure. As shown in FIG. 6 and FIG. 7, in some embodiments, the extremum point N' of the first curve L1 may be determined by means of curve fitting. It should be noted that if a position of the origin of the xoy coordinate system changes (e.g., positions of the x-axis and/or the y-axis change), a fitting function equation of the first curve L1 may also change correspondingly. Merely by way of example, the x-axis of the xoy coordinate system is arranged in the position of a long-axis of the projection of the sound production component 11 (the long-axis is a connection line connecting two endpoints with the largest extension size in the shape of the projection of the sound production component 11), and the y-axis is arranged 13 mm behind the projection point K' of the upper vertex K. Then the first curve L1 is fitted by a quartic polynomial function in the xoy coordinate system, and an exemplary fitting function equation of the first curve L1 may be obtained:

$$y=-0.0003059*x^{\wedge}4-0.002301*x^{\wedge}3-0.004005*x^{\wedge}2+0.07309*x+23.39 \quad \text{(Equation 1)}.$$

In some embodiments, in order to enable an image of the fitting function to include the first curve L1, a range of a value of an independent variable x of the fitting function equation may be relatively large, so that two end points (point P and point Q) of the first curve L1 are included, and the fitting function equation can completely reflect the feature of the first curve L1. In some embodiments, the range of the value of the independent variable x of the fitting function equation (i.e., the equation 1) is [−20, 15], i.e., −20×15. Further, in order to reduce a part of an image of the fitting function equation (i.e., the equation 1) that does not correspond to the first curve L1 to enable the fitting function equation to reflect the feature of the first curve L1 accurately, the value of the independent variable x of the fitting function equation (i.e., the equation 1) is [−18, 12], i.e., −18×12.

By calculating an independent variable x0 corresponding to a first derivative y'=0 of equation 1, an abscissa of the extremum point N' of the first curve L1 in the xoy coordinate system may be determined (a method for determining the extremum point may be found in related descriptions hereinafter), and then the coordinates of the extremum point N' in the coordinate system xoy is determined by substituting the independent variable x0 into the equation 1. In equation 1 mentioned above, the coordinates of the extremum point N' are (2.3544, 23.5005).

It should be noted that a function equation (e.g., equation 1) of the first curve L1 obtained by polynomial fitting is an approximate expression of the first curve L1. When a count of sampling points for fitting the function equation is large (e.g., greater than 10) and evenly distributed, a curve represented by the function equation may be considered as the first curve L1. The function equation fitted in the present disclosure is only an example, mainly used to describe the feature (including an extremum point, an inflection point, a first derivative, a second derivative, etc.) of the first curve L1. The specific function equation (e.g., the equation 1) of the first curve L1 is related to the selection of the origin o of the coordinate system xoy. The function equation is different when the origin o is different. However, in the case of a horizontal axis (x-axis) and a vertical axis (y-axis) of the coordinate system remaining unchanged, relative positions of the features of the first curve L1 such as the extremum point and the inflection point on the first curve L1 are certain, and properties of the first derivative and the second derivative of the first curve L1 are also certain, which do not vary with a position of the origin o of the coordinate system xoy. The present disclosure is non-limiting to the selection of the origin o of the coordinate system xoy for fitting the first curve L1 and the equation of the first curve L1. For example, in order to determine a position relationship between the extremum point and the upper vertex, the y-axis of the coordinate system xoy may be set to pass through the projection point K' of the upper vertex K, and the equation of the first curve L1 may change accordingly.

In some embodiments, the first derivative y' and the second derivative y" of the function equation y of the first curve L1 may be further determined. By calculating the abscissa x0 corresponding to the first derivative y'=0, and then determining whether a value of the second derivative y" corresponding to x0 is positive or negative, whether the extremum point N' is a maximum point or a minimum point can be determined. If a value of the second derivative y" corresponding to x0 is greater than 0, a corresponding coordinate point (x0, y0) is a minimum point; if the value of the second derivative y" corresponding to x0 is less than 0, then the corresponding coordinate point (x0, y0) is a maximum point. In some embodiments, the extremum point N' of the first curve L1 is a maximum point.

In some embodiments, the extremum point N' of the first curve L1 may also be determined in other ways. For example, the extremum point N' of the first curve L1 may be determined by determining a function value y and a function value y0 corresponding to different values in intervals near the left and right sides of x0, by determining a positivity and negativity difference of the values y' of the first derivative corresponding to the different values in intervals near the left and right sides of x0, etc., which are not limited in the present disclosure.

In some embodiments, instead of determining the extremum point N' of the first curve L1 by fitting the function equation of the first curve L1, the extremum point N' of the first curve L1 may be determined in other ways. For example, on a projection of the earphone 10 on the user's sagittal plane (the projection may be obtained by taking a picture directly facing the user's sagittal plane), a scale perpendicular to the long-axis direction Y is taken along the long-axis direction Y to move from point P of the first curve L1 to point Q, and during the movement, when an intersection point between the first curve L1 and the scale has a maximum value on the scale, the intersection point is the extremum point N' of the first curve L1.

Figure 8:
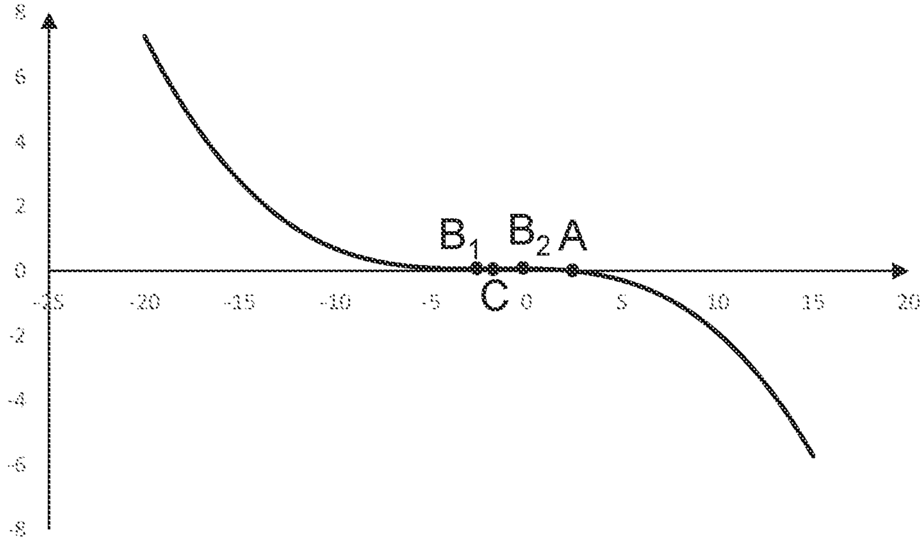
FIG. 8 is a schematic diagram illustrating an exemplary first derivative curve of a fitting curve according to some embodiments of the present disclosure.

FIG. 8 is a schematic diagram illustrating an exemplary first derivative curve of a fitting curve according to some embodiments of the present disclosure. As shown in FIG. 8, in some embodiments, the first curve L1 has a first derivative:

$$y'=-0.0012236*x\hat{}-0.006903*x\hat{}2-0.00801*x+0.07309 \quad \text{(Equation 2).}$$

In some embodiments, the first derivative of the first curve L1 is continuous.

In some embodiments, the first derivative of the first curve L1 (i.e., the equation 2) has a zero point (point A), that is, equation y'=0 has one solution, which corresponds to an abscissa of point A. In some embodiments, according to equation 2, it may be determined that a coordinate of point A is (2.3544, 0). The abscissa of point A is substituted into equation 1 of the first curve L1, it can be known that a point of the first curve L1 corresponding to the abscissa of point A is a point having the maximum value of the first curve L1 in the xoy coordinate system, and the point is also the maximum point of the first curve L1 so that the point can be recorded as the extremum point N' of the first curve L1.

In some embodiments, in the first rectangular coordinate system xoy, the first derivative of the first curve L1 has one or more inflection points. In some embodiments, in the first rectangular coordinate system xoy, a count of the one or more inflection points of the first derivative of the first curve L1 is one, that is, point C. As shown in FIG. 8, on the left side of point C, an image curve of the first derivative is a concave function, on the right side of point C, the image curve of the first derivative is a convex function, and point C is a change point of concavity and convexity of the image curve of the first derivative and is an inflection point of the first derivative.

In some embodiments, as shown in FIG. 8, in the first rectangular coordinate system xoy, parts on both sides of the inflection point of the first derivative of the first curve L1 respectively have extremum points (i.e., point B1 and point B2). Curves of the first derivative of the first curve L1 on the left side and the right side near point B1 are located above point B1, that is, in a region on the left side and right side near point B1, a function value of the first derivative corresponding to point B1 is the smallest, and point B1 is a minimum point of the first derivative. Curves of the first derivative of the first curve L1 on the left side and the right side near point B2 are located below point B2, that is, in a region on the left side and the right side near point B2, the function value of the first derivative corresponding to point B2 is the largest, and point B2 is a maximum point of the first derivative.

In some embodiments, the extremum point of the first derivative of the first curve L1 may also be determined according to a second derivative and a third derivative of the first curve L1, detailed descriptions of which may refer to a manner for determining the extremum point of the first curve L1, which are not repeated here.

In some embodiments, according to equation 2, the coordinates of point B1 may be determined as (−3.0442, 0.0680), and the coordinates of point B2 may be determined as (−0.7168, 0.0757).

Figure 9:
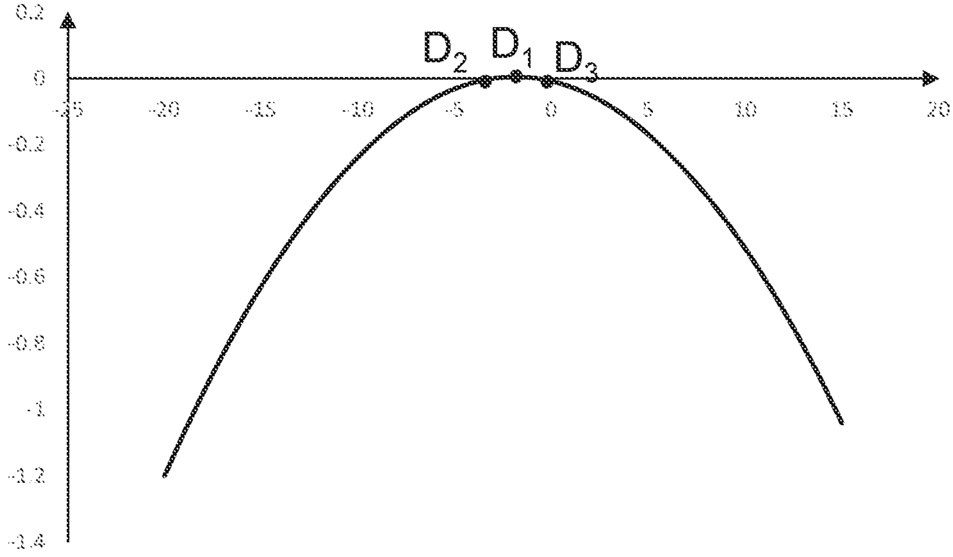
FIG. 9 is a schematic diagram illustrating an exemplary second derivative curve of a fitting curve according to some embodiments of the present disclosure.

FIG. 9 is a schematic diagram illustrating an exemplary second derivative curve of a fitting curve according to some embodiments of the present disclosure. As shown in FIG. 9, in some embodiments, the first curve L1 has a second derivative:

$$y''=-0.0036708*x\hat{}2-0.013806*x-0.00801 \quad \text{(Equation 3)}$$

In some embodiments, the second derivative of the first curve L1 is continuous.

In some embodiments, in the first rectangular coordinate system xoy, the second derivative of the first curve L1 has a maximum point, i.e., point D1. As shown in FIG. 9, curves of the second derivative of a fitting curve L2 on the left side and the right side near point D1 are all located below point D1, that is, in a region on the left side and the right side near point D1, a function value of the second derivative corresponding to point D1 is the largest, and point D1 is the maximum point of the second derivative.

In some embodiments, the second derivative of the first curve L1 has two zero points (i.e., point D2 and point D3), and an abscissa of point D2 corresponds to an abscissa of the extremum point B1 of the first derivative, that is, x=−0.30442. An abscissa of point D3 corresponds to an abscissa of the extremum point B2 of the first derivative, that is, x=−0.7168.

FIG. 10A and FIG. 10B are schematic diagrams illustrating an exemplary position structure of a centroid of an earphone according to some embodiments of the present disclosure. As shown in FIG. 10A and FIG. 10B, in some embodiments, a position of the centroid of the earphone 10 is point F. In some embodiments, affected by an internal structure of the sound production component 11 (e.g., a magnetic circuit, a circuit board, etc.), a mass of the sound production component 11 in the earphone 10 is relatively large. Therefore, the position of the centroid F of the earphone 10 is close to a position of a centroid H of the sound production component 11, or is greatly affected by a mass of the sound production component 11, that is, to a certain extent, the position of the centroid F of the earphone 10 may represent the position of the sound production component 11. For the convenience of explanation, a specific position of the centroid F of the earphone 10 may be described in detail below through relative positions of the centroid F of the earphone 10 and the sound production component 11.

As shown in FIG. 10A, in some embodiments, on a YZ plane, a distance between the centroid F of the earphone 10 and a lower side surface LS of the sound production component 11 may be within a range of 2 mm-6 mm. In some embodiments, on the YZ plane, the distance between the centroid F of the earphone 10 and the lower side surface LS of the sound production component 11 may be within a range of 3 mm-5 mm. In some embodiments, on the YZ plane, the distance between the centroid F of the earphone 10 and the lower side surface LS of the sound production component 11 may be within a range of 4 mm-4.5 mm.

In some embodiments, on the YZ plane, a distance between the centroid F of the earphone 10 and a long-axis (i.e., the x-axis) of the sound production component 11 may be within a range of 1 mm-3 mm. In some embodiments, on the YZ plane, the distance between the centroid F of the earphone 10 and the long-axis (i.e., the x-axis) of the sound production component 11 may be within a range of 1.5 mm-2.8 mm. In some embodiments, on the YZ plane, the distance between the centroid F of the earphone 10 and the long-axis (i.e., the x-axis) of the sound production component 11 may be within a range of 2 mm-2.5 mm.

In some embodiments, on the YZ plane, a distance between the centroid F of the earphone 10 and a free end FE of the sound production component 11 (i.e., a rear side surface RS) may be within a range of 4 mm-8 mm. In some embodiments, on the YZ plane, the distance between the centroid F of the earphone 10 and the free end FE of the sound production component 11 (i.e., the rear side surface RS) may be within a range of 5 mm-7 mm. In some embodiments, on the YZ plane, the distance between the centroid F of the earphone 10 and the free end FE of the sound production component 11 (i.e., the rear side surface RS) may be within a range of 6 mm-6.8 mm.

As shown in FIG. 10B, in some embodiments, on an XY plane, a distance between the centroid F of the earphone 10 and an inner side surface IS of the sound production component 11 may be within a range of 2 mm-6 mm. In some embodiments, on the YZ plane, the distance between the centroid F of the earphone 10 and the inner side surface IS of the sound production component 11 may be within a range of 3 mm-5 mm. In some embodiments, on the YZ plane, the distance between the centroid F of the earphone 10 and the inner side surface IS of the sound production component 11 may be within a range of 4.5 mm-4.8 mm.

In some embodiments, by designing the position of the centroid F, the upper vertex K, and the extremum point N of the ear hook of the earphone 10, the wearing stability and adjustability of the earphone 10 may be improved. In some embodiments, since the ear 100 mainly supports the earphone 10 through the upper vertex K of the ear hook 12, when the user wears the earphone 10, it may be regarded as forming a "supporting lever" with the upper vertex K as a support point. In the wearing state, the centroid F of the earphone 10 is located behind the upper vertex K (i.e., a side close to the back of the head of the user), which may prevent the earphone 10 from flipping forward (i.e., a direction away from the back of the head of the user) in the wearing state, thereby improving the wearing stability of the earphone 10. In some embodiments, the extremum point N of the ear hook may be a position with the smallest cross-section on the ear hook 12, so that the ear hook 12 is more likely to deform at the extremum point N of the ear hook. Therefore, when the user wears the earphone 10, the first part 121 of the ear hook 12 and the sound production component 11 may form a structure similar to a "clamping force lever" with the extremum point N of the ear hook as a fulcrum, and the structure is clamped on both sides of the ear of the user (e.g., a front side and a rear side of the auricular concha cavity). In order to improve the stability of the "supporting lever" and the "clamping force lever," the centroid F and the upper vertex K of the earphone 10 are respectively located on both sides of the extremum point N of the ear hook. The position of the centroid F, the upper vertex K, and the extremum point N of the ear hook may be further described in detail below.

Since the position of the centroid F of the earphone 10 is greatly affected by the position of the sound production component 11, when the overall volume of the ear hook 12 does not change much, to a certain extent, the positions of the upper vertex K and the centroid F of the earphone 10 reflect a relative position of the sound production component 11 on the ear when the earphone 10 is worn. Specifically, when a distance between the position of the centroid F of the earphone 10 and the upper vertex K of the ear hook 12 is too large, the position of the sound production component 11 may be closer to the earhole of the user when the user wears the earphone 10. Therefore, a position of the sound production component 11 is lower in an auricular concha cavity, and a gap between the upper side surface US of the sound production component 11 and the auricular concha cavity is too large, causing a weak sound effect. When the distance between the position of the centroid F of the earphone 10 and the upper vertex K of the ear hook 12 is too small, the upper side surface US of the sound production component 11 is attached to an upper edge of the auricular concha cavity, and the gap between the upper side surface US and the auricular concha cavity is too small or a count is too few. Therefore, an effect on sound leakage reduction is poor, and the sound inlet on the sound production component 11 is too far away from the external ear canal, which adversely affects the sound effect.

As shown in FIG. 6, in some embodiments, on the projection of the earphone 10 on the user's sagittal plane, in order to obtain a better sound effect, a distance between the projection point K' of the upper vertex K and a projection point F' of the centroid F of the earphone 10 may be within a range of 22 mm-35 mm. In some embodiments, in order to further improve the effect of sound leakage reduction, on the projection of the earphone 10 on the user's sagittal plane, the distance between the projection point K' of the upper vertex K and the projection point F' of the centroid F of the earphone 10 may be within a range of 25 mm-30 mm. In some embodiments, in order to make a cavity-like structure formed by the sound production component 11 and the auricular concha cavity have a more suitable volume and size/count of an opening, on the projection of the earphone 10 on the user's sagittal plane, the distance between the projection point K' of the upper vertex K and the projection point F' of the centroid F of the earphone 10 may be within a range of 27 mm-29 mm.

In some embodiments, in order to obtain a better sound effect, on the earphone 10, a distance between the upper vertex K and the centroid F of the earphone 10 may be within a range of 20 mm-38 mm. In some embodiments, in order to further improve the effect on sound leakage reduction, on the earphone 10, the distance between the upper vertex K and the centroid F of the earphone 10 may be within a range of 25 mm-32.5 mm. In some embodiments, in order to make the cavity-like structure formed by the sound production component 11 and the auricular concha cavity have a more suitable volume and size/count of the opening, on the earphone 10, the distance between the upper vertex K and the centroid F of the earphone 10 may be within a range of 27 mm-30 mm.

In some embodiments, an included angle $\alpha 1$ between a connection line connecting the centroid F of the earphone 10 and the upper vertex K of the ear hook 12 and the long-axis direction Y of the sound production component 11 may affect the wearing stability of the earphone 10 in the wearing state. When the included angle $\alpha 1$ between the connection line connecting the centroid F of the earphone 10 and the upper vertex K of the ear hook 12 and the long-axis direction Y of the sound production component 11 is too large, the free end FE of the sound production component 11 may be far away from a side wall of the auricular concha cavity of the user, and the clamping of the sound production component 11 on the auricular concha cavity is relatively weak, making the earphone 10 unstable to wear. When the included angle α1 between the connection line connecting the centroid F of the earphone 10 and the upper vertex K of the ear hook 12 and the long-axis direction Y of the sound production component 11 is too small, the free end FE of the sound production component 11 and the auricular concha cavity of the user fits too tight, the wearing comfort of the earphone 10 may be affected, and the adjustability of the earphone 10 may be reduced.

In some embodiments, in order to make the earphone 10 have higher wearing stability and adjustability, on the projection of the earphone 10 on the user's sagittal plane, the included angle α1 between the connection line K'F' connecting the projection point K' of the upper vertex K and the projection points F' of the centroid F of the earphone 10 and the long-axis direction Y (i.e., an x-axis direction) of the projection of the sound production component 11 may be within a range of 35°-60°. As shown in FIG. 6, it should be noted that the included angle α1 between the connection line K'F' connecting the projection point K' of the upper vertex K and the projection points F' of the centroid F of the earphone 10 and the long-axis direction Y (i.e., the x-axis direction) of the projection of the sound production component 11 refers to an angle between the connection line K'F' and the x-axis in a counterclockwise direction on the basis of a positive direction of the x-axis. In some embodiments, in order to further improve the wearing stability of the earphone 10, the included angle α1 between the connection line K'F' connecting the projection point K' of the upper vertex K and the projection points F' of the centroid F of the earphone 10 and the long-axis direction Y (i.e., the x-axis direction) of the projection of the sound production component 11 may be within a range of 40°-55°. In some embodiments, in order to further improve the adjustability of the earphone 10, the included angle α1 between the connection line K'F' connecting the projection point K' of the upper vertex K and the projection points F' of the centroid F of the earphone 10 and the long-axis direction Y (i.e., the x-axis direction) of the projection of the sound production component 11 may be within a range of 45°-50°.

In some embodiments, in addition to reflecting the included angle α1 between the connection line connecting the centroid F of the earphone 10 and the upper vertex K and the long-axis direction Y of the sound production component 11 through positions of the projection points mentioned above, an actual measurement can also be carried out on the ear hook 12. In some embodiments, in order to make the earphone 10 have higher wearing stability and adjustability, the included angle α1 between the connection line connecting the centroid F of the earphone 10 and the upper vertex K of the ear hook 12 and the long-axis direction Y of the sound production component 11 may be within a range of 30°-55°. In some embodiments, in order to further improve the wearing stability of the earphone 10, the included angle α1 between the connection line connecting the centroid F of the earphone 10 and the upper vertex K of the ear hook 12 and the long-axis direction Y of the sound production component 11 may be within a range of 40°-50°. In some embodiments, in order to further improve the adjustability of the earphone 10, the included angle α1 between the connection line connecting the centroid F of the earphone 10 and the upper vertex K of the ear hook 12 and the long-axis direction Y of the sound production component 11 may be within a range of 45°-48°.

As shown in FIG. 3 and FIG. 6, in some embodiments, the projection point of the centroid F of the earphone 10 on the user's sagittal plane is point F'. In some embodiments, when a distance between the centroid F of the earphone 10 and the extremum point N of the ear hook is too large, a clamping position of the earphone 10 on the ear may be too low, and thus a fitting degree between the sound production component 11 and the auricular concha cavity may be poor, which can affect the cavity-like structure and lead to unstable wearing. As a result, a gap of the cavity-like entity formed by the sound production component 11 and the auricular concha cavity is too large, thereby leading to a poor sound effect. When the distance between the centroid F of the earphone 10 and the extremum point N of the ear hook is too small, it means that a force arm at both ends of the fulcrum of the "clamping force lever" mentioned above may be too small, and the stability of the lever structure may be poor when a clamping force remains unchanged, and the earphone 10 may be unstable to wear in the wearing state.

In some embodiments, in order to make the earphone 10 have higher wearing stability and better sound effect in the wearing state, on the projection of the earphone 10 on the user's sagittal plane, a distance between the extremum point N' and the projection point F' of the centroid F of the earphone 10 may be within a range of 20 mm-35 mm. In some embodiments, in order to further improve the wearing stability of the earphone 10, on the projection of the earphone 10 on the user's sagittal plane, the distance between the extremum point N' and the projection point F' of the centroid F of the earphone 10 may be within a range of 25 mm-30 mm. In some embodiments, in order to further improve the sound effect, on the projection of the earphone 10 on the user's sagittal plane, the distance between the extremum point N' and the projection point F' of the centroid F of the earphone 10 may be within a range of 27 mm-28 mm.

In some embodiments, in order to make the earphone 10 have higher wearing stability and better sound effect in the wearing state, on the earphone 10, a distance between the centroid F of the earphone 10 and the extremum point N of the ear hook may be within a range of 18 mm-40 mm. In some embodiments, in order to further improve the wearing stability, on the earphone 10, the distance between the centroid F of the earphone 10 and the extremum point N of the ear hook may be within a range of 24 mm-31 mm. In some embodiments, in order to further improve the sound effect, the distance between the centroid F of the earphone 10 and the extremum point N of the ear hook may be within a range of 26 mm-29 mm.

In some embodiments, as shown in FIG. 6, on the projection of the earphone 10 on the user's sagittal plane, a first included angle α2 between the connection line N'F' connecting the extremum point N' and the projection point F' of the centroid of the earphone 10 and the long-axis direction Y (i.e., the x-axis direction) of the projection of the sound production component 11 may be less than 90° so that the projection point F' of the centroid F of the earphone 10 is located behind the extremum point N' in the long-axis direction Y of the sound production component 11. Since the centroid F of the earphone 10 is mainly affected by the mass of the sound production component 11, to a certain extent, the position of the centroid F also reflects the clamping position of the sound production component 11 on the auricular concha cavity, that is, the clamping position of the sound production component 11 on the auricular concha cavity, compared with the extremum point N of the ear hook, is closer to the back of the head of the user, so as to further enhance the stability of the "clamping force lever" mentioned above. As shown in FIG. 6, it should be noted that the first included angle α2 between the connection line N'F' connecting the extremum point N' and the projection point F' of the centroid of the earphone 10 and the long-axis direction Y (i.e., the x-axis direction) of the projection of the sound production component 11 refers to an included angle between the connection line N'F' and the x-axis in the counterclockwise direction on the basis of the positive direction of the x-axis.

When the first included angle α2 between a connection line connecting the centroid F of the earphone 10 and the extremum point N of the ear hook and the long-axis direction Y of the sound production component 11 is too large, the clamping position of the sound production component 11 is lower relative to the auricular concha cavity, and the gap between the upper side surface US and the auricular concha cavity is too large, causing a weak sound effect. When the first included angle α2 between the connection line connecting the centroid F of the earphone 10 and the extremum point N of the ear hook and the long-axis direction Y of the sound production component 11 is too small, the clamping position of the sound production component 11 is too high relative to the auricular concha cavity, the upper side surface US of the sound production component 11 is attached to an upper edge of the auricular concha cavity, and the gap between the upper side surface US and the auricular concha cavity is too small or a count is too few, causing a poor effect on sound leakage reduction. Due to a limited space of the auricular concha cavity of the user, the clamping position of the sound production component 11 is too low or too high relative to the auricular concha cavity, which makes it difficult for the earphone 10 to be stably clamped on the ear of the user due to a shape restriction of the auricular concha cavity.

In some embodiments, in order to obtain a better sound effect, the first included angle α2 between the connection line N'F' connecting the extremum point N' and the projection point F' of the centroid F of the earphone 10 and the long-axis direction Y (i.e., the x-axis direction) of the projection of the sound production component 11 may be within a range of 60°-80°. In some embodiments, in order to further improve the effect on sound leakage reduction, the first included angle α2 between the connection line N'F' connecting the extremum point N' and the projection point F' of the centroid F of the earphone 10 and the long-axis direction Y (i.e., the x-axis direction) of the projection of the sound production component 11 may be within a range of 60°-75°. In some embodiments, in order to make the cavity-like structure formed by the sound production component 11 and the auricular concha cavity have the more suitable volume and size/count of the opening, and make the clamping position of the sound production component 11 be located at a better position in the auricular concha cavity, the first included angle α2 between the connection line N'F' connecting the extremum point N' and the projection point F' of the centroid F of the earphone 10 and the long-axis direction Y (i.e., the x-axis direction) of the projection of the sound production component 11 may be within a range of 65°-70°.

In some embodiments, in addition to reflecting the first included angle α2 between the connection line connecting the centroid F of the earphone 10 and the extremum point N of the ear hook and the long-axis direction Y of the sound production component 11 through positions of the projection points mentioned above, an actual measurement can also be carried out on the ear hook 12. In some embodiments, in order to obtain a better sound effect, on the earphone 10, the first included angle α2 between the connection line connecting the centroid F of the earphone 10 and the extremum point N of the ear hook and the long-axis direction Y of the sound production component 11 may be within a range of 50°-90°. In some embodiments, in order to further improve the effect on sound leakage reduction, on the earphone 10, the first included angle α2 between the connection line connecting the centroid F of the earphone 10 and the extremum point N of the ear hook and the long-axis direction Y of the sound production component 11 may be within a range of 55°-85°. In some embodiments, in order to make the cavity-like structure formed by the sound production component 11 and the auricular concha cavity have the more suitable volume and size/count of the opening, and make the clamping position of the sound production component 11 be located at a better position in the auricular concha cavity, on the earphone 10, the first included angle α2 between the connection line connecting the centroid F of the earphone 10 and the extremum point N of the ear hook and the long-axis direction Y of the sound production component 11 may be within a range of 60°-75°.

In some embodiments, in addition to setting the position of the centroid F of the earphone 10, a position of a centroid H of the sound production component 11 may also be directly set to improve the wearing stability and sound effect of the earphone 10. As shown in FIG. 3 and FIG. 4, in some embodiments, a projection point of the centroid H of the sound production component 11 on the user's sagittal plane may coincide with a center of the projection of the sound production component 11 on the user's sagittal plane. In some embodiments, on the earphone 10, by changing a distance between the centroid H of the sound production component 11 and the extremum point N of the ear hook, a covering position of the sound production component 11 in the auricular concha cavity in the wearing state and the clamping position of the sound production component 11 on the auricular concha cavity may be changed, which not only affect the wearing stability and the wearing comfort of the earphone 10 but also affect the sound effect of the earphone 10.

When the shape and size of the sound production component 11 are consistent, if the distance between the centroid H of the sound production component 11 and the extremum point N of the ear hook is too large, the position of the sound production component 11 on the auricular concha cavity may be lower, and the gap between the upper side surface US of the sound production component 11 and the auricular concha cavity is too large, which leads to a poor sound effect. Moreover, if the distance between the centroid H of the sound production component 11 and the extremum point N of the ear hook is too large, the sound production component 11 (or a connection region between the ear hook 12 and the sound production component 11) may be too squeezed on the tragus, which leads to excessive pressure on the tragus by the sound production component 11 and affects the wearing comfort.

When the shape and size of the sound production component 11 are consistent, if the distance between the centroid H of the sound production component 11 and the extremum point N of the ear hook is too small, the upper side surface US of the sound production component 11 may be attached to an upper edge of the auricular concha cavity, and the gap between the upper side surface US of the sound production component 11 and the auricular concha cavity is too small or a count is too few, so that an inside environment and an outside environment are completely sealed and isolated, and the cavity-like structure cannot be formed. Moreover, if the distance between the centroid H of the sound production component 11 and the extremum point N of the ear hook is too small, the sound production component 11 (or the connection region between the ear hook 12 and the sound production component) may be too squeezed on an outer contour of the ear, which also affects the wearing comfort.

In some embodiments, a projection point of the centroid H of the sound production component 11 on the user's sagittal plane and the center of the projection of the sound production component 11 on the user's sagittal plane are point H', and point H' is located on the long-axis of the projection of the sound production component 11, that is, point H' lies on the x-axis. In some embodiments, in order to make the earphone 10 have a better sound effect in the wearing state, a distance between the extremum point N' and the projection point H' of the centroid H of the sound production component 11 on the user's sagittal plane may be within a range of 20 mm-30 mm. In some embodiments, in order to further improve the effect on sound leakage reduction, the distance between the extremum point N' and the projection point H' of the centroid H of the sound production component 11 on the user's sagittal plane may be within a range of 22 mm-26 mm. In some embodiments, in order to make the cavity-like structure formed by the sound production component 11 and the auricular concha cavity have a more suitable volume and size/count of the opening, and make the clamping position of the sound production component 11 be located at a better position on the auricular concha cavity, the distance between the extremum point N' and the projection point H' of the centroid H of the sound production component 11 on the user's sagittal plane may be within a range of 23 mm-25 mm.

In some embodiments, in addition to reflecting the distance between the centroid H of the sound production component 11 and the extremum point N of the ear hook through the distance between the projection points mentioned above, an actual measurement can also be carried out on the ear hook 12. In some embodiments, on the earphone 10, in order to make the earphone 10 have a better sound effect in the wearing state, the distance between the centroid H of the sound production component 11 and the extremum point N of the ear hook may be within a range of 20 mm-30 mm. In some embodiments, in order to further improve the effect on sound leakage reduction, on the earphone 10, the distance between the centroid H of the sound production component 11 and the extremum point N of the ear hook may be within a range of 24 mm-26 mm. In some embodiments, in order to make the cavity-like structure formed by the sound production component 11 and the auricular concha cavity have a more suitable volume and size/count of the opening, and make the clamping position of the sound production component 11 be located at a better position on the auricular concha cavity, on the earphone 10, the distance between the centroid H of the sound production component 11 and the extremum point N of the ear hook may be within a range of 24 mm-26 mm.

In some embodiments, a second included angle α3 between a connection line connecting the centroid H of the sound production component 11 and the extremum point N of the ear hook and the long-axis direction Y of the sound production component 11 may affect a position of the sound production component 11 inserted into the auricular concha cavity. When the second included angle α3 between the connection line connecting the centroid H of the sound production component 11 and the extremum point N of the ear hook and the long-axis direction Y of the sound production component 11 is too large, the position of the sound production component 11 on the auricular concha cavity is lower, the gap between the upper side surface US of the sound production component 11 and the auricular concha cavity is too large, causing a weak sound effect. When the second included angle α3 between the connection line connecting the centroid H of the sound production component 11 and the extremum point N of the ear hook and the long-axis direction Y of the sound production component 11 is too small, the upper side surface US of the sound production component 11 is attached to the upper edge of the auricular concha cavity, and the gap between the upper side surface US and the auricular concha cavity is too small or the count is too few, causing a poor effect on sound leakage reduction.

In some embodiments, the second included angle α3 between the connection line N'H' connecting the extremum point N' and the projection point H' of the centroid H of the sound production component 11 and the long-axis direction Y (i.e., the x-axis direction) of the projection of the sound production component 11 may be in a range less than 90°. Therefore, the projection point H' of the centroid H of the sound production component 11 is located on a rear side of the extremum point N' in the long-axis direction Y of the sound production component 11, i.e., compared with a corresponding point N of the extremum point N' on the ear hook 12, the centroid H of the sound production component 11 is closer to the back of the head of the user, so as to further enhance the stability of the "clamping force lever" mentioned above. As shown in FIG. 4, it should be noted that the second included angle α3 between the connection line N'H' connecting the extremum point N' and the projection point H' of the centroid of the sound production component 11 and the long-axis direction Y (i.e., the x-axis direction) of the projection of the sound production component 11 refers to an included angle between the connection line N'H' and the x-axis in the counterclockwise direction on the basis of the positive direction of the x-axis.

In some embodiments, in order to obtain a better sound effect, the second included angle α3 between the connection line N'H' connecting the extremum point N' and the projection point H' of the centroid H of the sound production component 11 and the long-axis direction Y (i.e., the x-axis direction) of the projection of the sound production component 11 may be within a range of 65°-85°. In some embodiments, in order to further improve the effect on sound leakage reduction, the second included angle α3 between the connection line N'H' connecting the extremum point N' and the projection point H' of the centroid H of the sound production component 11 and the long-axis direction Y (i.e., the x-axis direction) of the projection of the sound production component 11 may be within a range of 70°-80°. In some embodiments, in order to make the cavity-like structure formed by the sound production component 11 and the auricular concha cavity have a more suitable volume and size/count of the opening, and make the clamping position of the sound production component 11 be located at a better position on the auricular concha cavity, the second included angle α3 between the connection line N'H' connecting the extremum point N' and the projection point H' of the centroid H of the sound production component 11 and the long-axis direction Y (i.e., the x-axis direction) of the projection of the sound production component 11 may be within a range of 75°-79°.

In some embodiments, in addition to reflecting the second included angle α3 between the connection line connecting the centroid H of the sound production component 11 and the extremum point N of the ear hook and the long-axis direction Y of the sound production component 11 through the positions of the projection points mentioned above, an actual measurement can also be carried out on the ear hook 12. In some embodiments, in order to obtain a better sound effect, on the earphone 10, the second included angle α3 between the connection line connecting the centroid H of the sound production component 11 and the extremum point N of the ear hook and the long-axis direction Y of the sound production component 11 may be within a range of 70°-85°. In some embodiments, in order to further improve the effect on sound leakage reduction, on the earphone 10, the second included angle α3 between the connection line connecting the centroid H of the sound production component 11 and the extremum point N of the ear hook and the long-axis direction Y of the sound production component 11 may be within a range of 75°-80°. In some embodiments, in order to make the cavity-like structure formed by the sound production component 11 and the auricular concha cavity have a more suitable volume and size/count of the opening, and make the clamping position of the sound production component 11 be located at a better position on the auricular concha cavity, on the earphone 10, the second included angle α3 between the connection line connecting the centroid H of the sound production component 11 and the extremum point N of the ear hook and the long-axis direction Y of the sound production component 11 may be within a range of 77°-80°.

In some embodiments, on the user's sagittal plane, the first included angle α2 between the connection line N'F' connecting the extremum point N' and the projection point F' of the centroid F of the earphone 10 and the long-axis direction Y (i.e., the x-axis direction) of the projection of the sound production component 11 is smaller than the second included angle α3 between the connection line connecting the extremum point N' and the projection point H' of the centroid H of the sound production component 11 and the long-axis direction Y (i.e., the x-axis direction) of the projection of the sound production component 11. That is, the first included angle α2 between the connection line N'F' and the x-axis is smaller than the second included angle α3 between the connection line N'H' and the x-axis, so that the centroid F of the earphone 10 is located on a rear side of the centroid H of the sound production component 11 in the long-axis direction Y of the sound production component 11, that is, compared with the centroid H of the sound production component 11, the centroid F of the earphone 10 is closer to the back of the head of the user. Through the above arrangements, the ear hook 12 may better clamp the ear of the user when the earphone 10 is in the wearing state, further enhancing the stability of the "clamping force lever" mentioned above.

In some embodiments, an included angle α4 between the connection line connecting the centroid H of the sound production component 11 and the extremum point N of the ear hook and a plane S1 of the ear hook 12 (which is also referred to as an ear hook plane S1) may affect a degree to which the sound production component 11 is inserted into the auricular concha cavity of the user when the earphone 10 is in the wearing state. If the included angle α4 between the connection line connecting the centroid H of the sound production component 11 and the extremum point N of the ear hook and the plane of the ear hook 12 is too small, the sound production component 11 may be inserted too deep into the auricular concha cavity, and the position of the sound production component 11 may be too close to the earhole of the user. In this case, the earhole is blocked to a certain extent, and the communication between the earhole and the external environment cannot be realized, thus an original design purpose of the earphone 10 cannot be implemented. If the included angle α4 between the connection line connecting the centroid H of the sound production component 11 and the extremum point N of the ear hook and the plane of the ear hook 12 is too large, it may affect the sound production component 11 to be inserted into the auricular concha cavity (e.g., causing the gap between the sound production component 11 and the auricular concha cavity to be too large), which further affects the sound effect of the sound production component 11.

Figure 11:
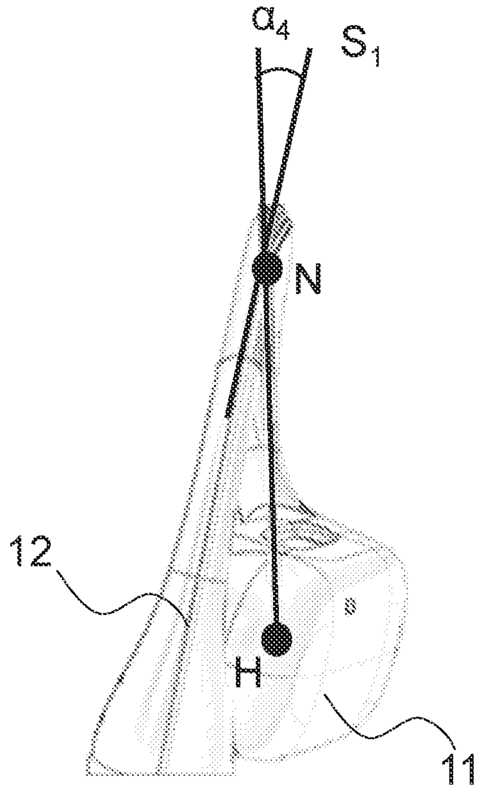
FIG. 11 is a schematic diagram illustrating an exemplary position of a centroid of a sound production component according to some embodiments of the present disclosure.

FIG. 11 is a schematic diagram illustrating an exemplary position of a centroid of a sound production component according to some embodiments of the present disclosure. As shown in FIG. 11, in some embodiments, in order to make the earphone 10 have a better sound effect, an included angle α4 between a connection line HN connecting the extremum point N of the ear hook and the centroid H of the sound production component 11 and the plane S1 of the ear hook 12 may be within a range of 10°-18°. As shown in FIG. 3, the plane S1 of the ear hook 12 may be determined by the upper vertex K on the ear hook 12, the extremum point N of the ear hook 12, point Q on the ear hook 12, and point P on the ear hook 12. In some embodiments, in order to further prevent the sound production component 11 from being too close to the earhole of the user, the included angle α4 between the connection line HN connecting the extremum point N of the ear hook and the centroid H of the sound production component 11 and the plane S1 of the ear hook 12 may be within a range of 12°-16°. In some embodiments, in order to further improve a sound effect, the included angle α4 between the connection line HN connecting the extremum point N of the ear hook and the centroid H of the sound production component 11 and the plane S1 of the ear hook 12 may be within a range of 13°-14°.

In some embodiments, an included angle between the inner side surface IS of the sound production component 11 and the plane S1 where the ear hook 12 is located may also affect the sound production component 11 to be inserted into an auricular concha cavity. The included angle between the inner side surface IS of the sound production component 11 and the plane S1 where the ear hook 12 is located refers to a smaller included angle among angles formed by the intersection of two planes. If the included angle mentioned above is too large, the sound production component 11 may be inserted too much into the auricular concha cavity, and a position of the sound production component 11 may be too close to the earhole of the user, which may block the earhole, and the sound production component 11 may cause pressure on the tragus of the user. If the included angle mentioned above is too small, the part of the sound production component 11 inserting into the auricular concha cavity may be too small, and the gap between the sound production component 11 and the auricular concha cavity is too large, thereby affecting the sound effect of the sound production component 11.

Figure 12:
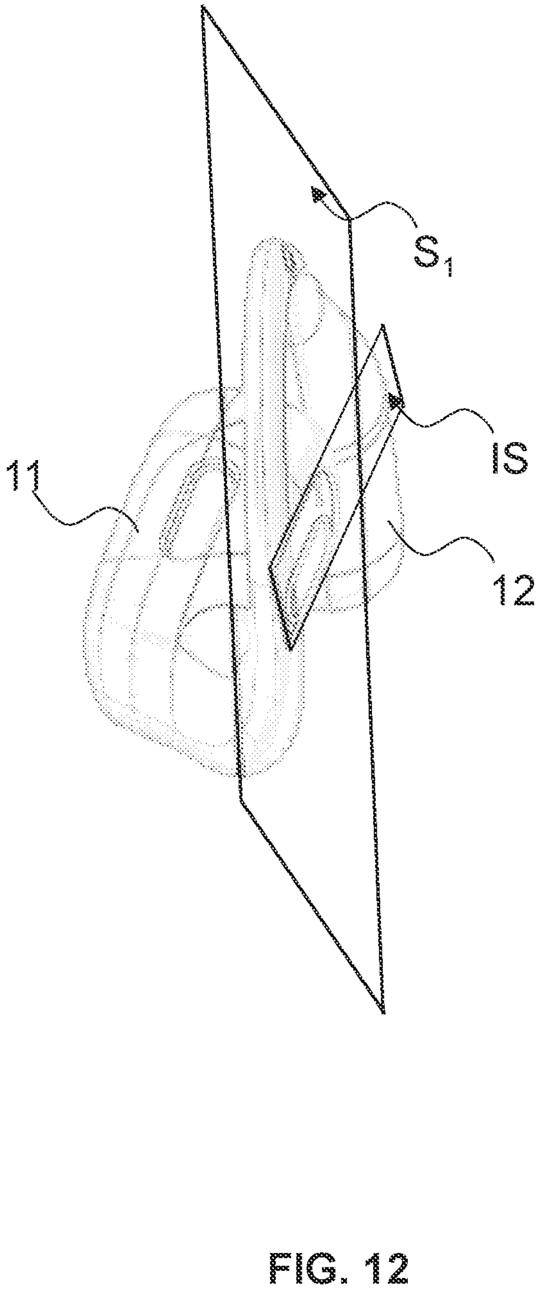
FIG. 12 is a schematic diagram illustrating exemplary positions of an inner side surface of a sound production component and an ear hook plane according to some embodiments of the present disclosure.

FIG. 12 is a schematic diagram illustrating exemplary positions of an inner side surface of a sound production component and an ear hook plane according to some embodiments of the present disclosure. As shown in FIG. 12, in some embodiments, in order to prevent the sound production component 11 from blocking the earhole, an included angle between the inner side surface IS of the sound production component 11 and the plane S1 where the ear hook 12 is located may be within a range of 15°-25°. In some embodiments, in order to further improve a sound effect, the included angle between the inner side surface IS of the sound production component 11 and the plane S1 where the ear hook 12 is located may be within a range of 17°-23°. In some embodiments, in order to make a cavity-like structure formed by the sound production component 11 and an auricular concha cavity have a more suitable volume and size/count of an opening, the included angle between the inner side surface IS of the sound production component 11 and the plane S1 where the ear hook 12 is located may be within a range of 19°-20°.

In some embodiments, by designing a maximum vertical distance between the ear hook 12 and the inner side surface IS of the sound production component 11, an ear of a user may be well accommodated between the ear hook 12 and the sound production component 11 when the earphone 10 is in a wearing state. Therefore, the ear hook 12 may be well adapted to the ear of the user, which improves the wearing comfort and wearing stability of the earphone 10. If the maximum vertical distance between the ear hook 12 and the inner side surface IS of the sound production component 11 is too large, the wearing stability of the earphone 10 may be affected. If the maximum vertical distance between the ear hook 12 and the inner side surface IS of the sound production component 11 is too small, the adjustability of the earphone 10 may be affected.

Figure 13:
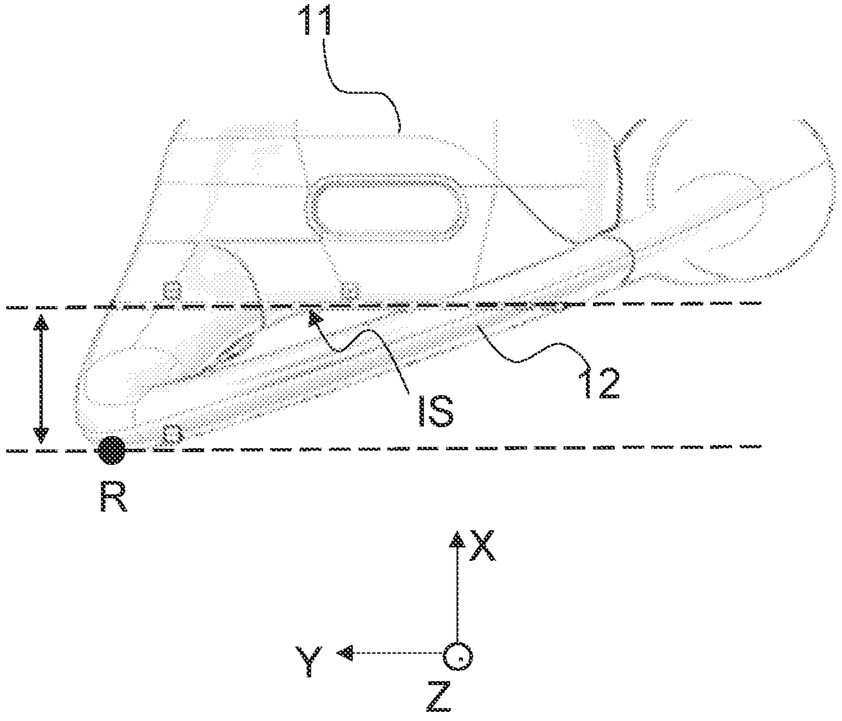
FIG. 13 is a schematic diagram illustrating an exemplary position of a point on an ear hook whose vertical distance is the farthest from an inner side surface of a sound production component according to some embodiments of the present disclosure.

FIG. 13 is a schematic diagram illustrating an exemplary position of a point on an ear hook whose vertical distance is the farthest from an inner side surface of a sound production component according to some embodiments of the present disclosure. As shown in FIG. 13, in some embodiments, on an XY plane, point R is a point on the ear hook 12 having the farthest vertical distance from the inner side surface IS of the sound production component 11. In some embodiments, in order to make the earphone 10 have better wearing stability and adjustability, a vertical distance between point R and the inner side surface IS of the sound production component 11 may be within a range of 6 mm-9 mm, that is, a farthest vertical distance between the ear hook 12 and the inner side surface IS of the sound production component 11 may be within a range of 6 mm-9 mm. In some embodiments, in order to further improve the wearing stability, the vertical distance between point R and the inner side surface IS of the sound production component 11 may be within a range of 7 mm-8 mm. In some embodiments, in order to further improve the adjustability, the vertical distance between point R and the inner side surface IS of the sound production component 11 may be within a range of 7.5 mm-7.9 mm.

As shown in FIG. 3 and FIG. 4, in some embodiments, due to a limited space between the ear of the user and head, in order to facilitate the user to wear the earphone, a cross-section of the ear hook 12 near the extremum point N of the ear hook is set to be relatively small, and due to a volume limitation of a battery in the battery compartment 13, a cross-section of the battery compartment 13 is set to be relatively large. Therefore, in order to make the shape transition of the ear hook 12 smooth, a section connected to the battery compartment 13 on the ear hook 12 may be set as a transition section (not shown in the figure). In some embodiments, the transition section may be a section of the first part 121 of the ear hook 12 excluding the battery compartment 13 with a cross-section larger than 17.99 $mm^2$. As shown in FIG. 4, in some embodiments, the transition section may be a section with the largest change rate of a cross-sectional area in the first part 121 of the ear hook 12. A starting point G1 corresponding to the transition section may be a position with the smallest cross-sectional area in the section, and an ending point G2 corresponding to the transition section may be a position with the largest cross-sectional area in the section. In some embodiments, the transition section may be connected to the battery compartment 13 through the ending point G2. It should be noted that point G1' and point G2' shown in FIG. 4 are projection points of the starting point G1 and the ending point G2 of the transition section on the user's sagittal plane, respectively.

In some embodiments, the transition section (or its cross-section) may be set in a shape that is narrow at the top and wide at the bottom (e.g., a pear shape) along a direction towards the sound production component 11, so as to increase a contact area with the ear of the user. In some embodiments, a projection of the transition section along the long-axis direction Y and a projection of the sound production component 11 along the long-axis direction Y have an overlapping region. The projection along the long-axis direction Y may be an orthographic projection on a reference plane (such as an XZ plane in FIG. 4) perpendicular to the long-axis direction Y. By setting the overlapping region of the transition section and the projection of the sound production component 11 along the long-axis direction Y, when the user wears the earphone, the sound production component 11 and the transition section may jointly clamp the ear of the user (e.g., a front side and a rear side of an auricular concha cavity) to improve the wearing stability of the earphone 10. In some embodiments, the overlapping region between the projection of the transition section along the long-axis direction Y and the projection of the sound production component 11 along the long-axis direction Y accounts for no less than 50% of the projection of the sound production component 11 along the long-axis direction Y. In some embodiments, in order to further improve the wearing stability of the earphone 10, the overlapping region between the projection of the transition section along the long-axis direction Y and the projection of the sound production component 11 along the long-axis direction Y accounts for no less than 70% of the projection of the sound production component 11 along the long-axis direction Y. In some embodiments, in order to further improve the wearing stability of the earphone 10, the overlapping region between the projection of the transition section along the long-axis direction Y and the projection of the sound production component 11 along the long-axis direction Y accounts for no less than 80% of the projection of the sound production component 11 along the long-axis direction Y.

When the user wears the earphone 10, since the transition section is the main contact region with the ear when the ear hook 12 clamps the ear, so a length of the transition section may affect the oppression sense (e.g., a pressure) of the ear hook 12 on the ear, and the wearing performance of the earphone 10 can be improved by reasonably setting the length of the transition section. In order to represent the length of the transition section, as shown in FIG. 4, the length of the transition section may be represented by an arc length of an inner curve (i.e., a curve section between point G1' and point G2') of a projection of the transition section on the user's sagittal plane. As shown in FIG. 4, in some embodiments, in order to reduce the pressure of the transition section on the ear of the user, the arc length of the inner curve of the projection of the transition section of the earphone 10 on the user's sagittal plane is within a range of 10 mm-14 mm. In some embodiments, in order to further reduce a size of the earphone 10 while reducing the pressure of the transition section on the ear of the user, the arc length of the inner curve of the projection of the transition section of the earphone 10 on the user's sagittal plane is within a range of 11 mm-13 mm.

In some embodiments, by setting a distance between the starting point G1 of the transition section and the upper vertex K or the extremum point N of the ear hook, a fit position of the transition section at the back of the ear may be adjusted when the earphone 10 is in the wearing state, thereby changing a direction of a clamping force of the ear hook 12 on the ear. In some embodiments, by setting the distance between the starting point G1 of the transition section and the upper vertex K or the extremum point N of the ear hook, the overlapping region between the projection of the transition section along the long-axis direction Y and the projection of the sound production component 11 along the long-axis direction Y may also be adjusted to improve the wearing stability of the earphone 10.

In some embodiments, in order to make the earphone 10 have better wearing stability, in the wearing state, on the projection of the earphone 10 on the user's sagittal plane, a distance between a starting point G1' of the inner curve of the projection of the transition section of the earphone 10 and the extremum point N' may be within a range of 24 mm-28 mm. In some embodiments, in order to make the overlapping region between the projection of the transition section along the long-axis direction Y and the projection of the sound production component 11 along the long-axis direction Y has an appropriate size, in the wearing state, on the projection of the earphone 10 on the user's sagittal plane, the distance between the starting point G1' of the inner curve of the projection of the transition section of the earphone 10 and the extremum point N' may be within a range of 25 mm-27 mm. In some embodiments, in order to make the clamping force of the ear hook 12 on the ear have an appropriate direction, in the wearing state, on the projection of the earphone 10 on the user's sagittal plane, the distance between the starting point G1' of the inner curve of the projection of the transition section of the earphone 10 and the extremum point N' may be within a range of 26 mm-26.5 mm.

In some embodiments, in order to make the earphone 10 have better wearing stability, in a non-wearing state, on the projection of the earphone 10 on the user's sagittal plane, the distance between the starting point G1' of the inner curve of the projection of the transition section of the earphone 10 and the extremum point N' may be within a range of 22 mm-26 mm. In some embodiments, in order to make the overlapping region between the projection of the transition section along the long-axis direction Y and the projection of the sound production component 11 along the long-axis direction Y have an appropriate size, in the non-wearing state, on the projection of the earphone 10 on the user's sagittal plane, the distance between the starting point G1' of the inner curve of the projection of the transition section of the earphone 10 and the extremum point N' may be within a range of 23 mm-26.5 mm. In some embodiments, in order to make the clamping force of the ear hook 12 on the ear have a suitable direction, in the non-wearing state, on the projection of the earphone 10 on the user's sagittal plane, the distance between the starting point G1' of the inner curve of the projection of the transition section of the earphone 10 and the extremum point N' may be within a range of 24 mm-25 mm.

In some embodiments, in order to make the earphone 10 have better wearing stability, in the wearing state, on the projection of the earphone 10 on the user's sagittal plane, a distance between the starting point G1' of the inner curve of the projection of the transition section of the earphone 10 and the projection point K' of the upper vertex K' may be within a range of 31 mm-35 mm. In some embodiments, in order to make the overlapping region between the projection of the transition section along the long-axis direction Y and the projection of the sound production component 11 along the long-axis direction Y have an appropriate size, in the wearing state, on the projection of the earphone 10 on the user's sagittal plane, the distance between the starting point G1' of the inner curve of the projection of the transition section of the earphone 10 and the projection point K' of the upper vertex K' may be within a range of 32 mm-34 mm. In some embodiments, in order to make the clamping force of the ear hook 12 on the ear have an appropriate direction, in the wearing state, on the projection of the earphone 10 on the user's sagittal plane, the distance between the starting point G1' of the inner curve of the projection of the transition section of the earphone 10 and the projection point K' of the upper vertex K' may be within a range of 32.5 mm-33 mm.

In some embodiments, in order to make the earphone 10 have better wearing stability, in the non-wearing state, on the projection of the earphone 10 on the user's sagittal plane, the distance between the starting point G1' of the inner curve of the projection of the transition section of the earphone 10 and the projection point K' of the upper vertex K' may be within a range of 28 mm-32 mm. In some embodiments, in order to make the overlapping region between the projection of the transition section along the long-axis direction Y and the projection of the sound production component 11 along the long-axis direction Y has an appropriate size, in the non-wearing state, on the projection of the earphone 10 on the user's sagittal plane, the distance between the starting point G1' of the inner curve of the projection of the transition section of the earphone 10 and the projection point K' of the upper vertex K' may be within a range of 29 mm-31 mm. In some embodiments, in order to make the clamping force of the ear hook 12 on the ear have an appropriate direction, in the non-wearing state, on the projection of the earphone 10 on the user's sagittal plane, the distance between the starting point G1' of the inner curve of the projection of the transition section of the earphone 10 and the projection point K' of the upper vertex K' may be within a range of 30 mm-30.8 mm.

In some embodiments, by setting an included angle $\alpha$5 between a connection line connecting the starting point G1' of the inner curve of the projection of the transition section on the user's sagittal plane and the extremum point N' and a connection line connecting the starting point G1' of the transition section and the projection point K' of the upper vertex K, a fitting degree of a section between the upper vertex K and the transition section of the ear hook 12 with the back of the ear in the wearing state may be adjusted, thereby affecting the wearing stability of the earphone 10. In some embodiments, when a position of the extremum point N and a position of the upper vertex K of the ear hook is determined, by setting the included angle $\alpha$5 between the connection line connecting the starting point G1' of the inner curve of the projection of the transition section on the user's sagittal plane and the extremum point N' and the connection line connecting the starting point G1' of the transition section and the projection point K' of the upper vertex K, the overlapping region between the projection of the transition section along the long-axis direction Y and the projection of the sound production component 11 along the long-axis direction Y may also be adjusted, thereby improving the wearing stability of the earphone 10.

In some embodiments, in order to make the earphone 10 have better wearing stability, in the wearing state, on the projection of the earphone 10 on the user's sagittal plane, the included angle $\alpha$5 between the connection line connecting the starting point G1' of the inner curve of the projection of the transition section and the extremum point N' and the connection line connecting the starting point G1' of the transition section and the projection point K' of the upper vertex K may be within a range of 18°-22°. In some embodiments, in order to further improve the wearing stability of the earphone 10, in the wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 18.5°-21°. In some embodiments, in order to further improve the wearing stability of the earphone 10, in the wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 19°-20°.

In some embodiments, in order to make the earphone 10 have better wearing stability, in the non-wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 20°-24°. In some embodiments, to further improve the wearing stability of the earphone 10, in the non-wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 20.4°-22°. In some embodiments, to further improve the wearing stability of the earphone 10, in the non-wearing state, on the projection of the earphone 10 on the user's sagittal plane, the included angle α5 between the connection line connecting the starting point G1' of the inner curve of the projection of the transition section and the extremum point N' and the connection line connecting the starting point G1' of the transition section and the projection point K' of the upper vertex K may be within a range of 20.5°-21°.

In some embodiments, the ear hook 12 of the earphone 10 is a variable cross-section structure, and a cross-sectional area of the ear hook 12 near the extremum point N' of the first curve L1 is the smallest. The variable cross-section structure refers that the ear hook 12 has positions or regions with different cross-section shapes or sizes along its extending direction. By setting the ear hook 12 as the variable cross-section structure, cross-sections of different positions of the ear hook 12 may be set separately to meet the fitting requirements of different positions on the ear 100 of the user.

In some embodiments, due to a limited space between the user's ear and head, a cross-section of the ear hook 12 corresponds to an arc section (e.g., an arc with an arc length within 5 mm on both sides of the extremum point N of the ear hook) near the extremum point N of the ear hook may be set smaller than cross-sections of other parts, so that the ear hook 12 overall presents a shape that is thinner in the middle and thicker on both sides, thereby causing the ear hook 12 to be better accommodated in a space between the user's ear and head, which enhances the wearing comfort of the earphone 10.

In some embodiments, a cross-section at the extremum point N of the ear hook may be set to the minimum. When the earphone 10 changes from the non-wearing state to the wearing state, a part between the sound production component 11 and an end portion (e.g., the battery compartment) of the ear hook far away from the sound production component 11 may be stretched. In this case, a large strain is generated at the extremum point N of the ear hook, making the extremum point N form a clamping fulcrum during wearing.

Figure 14:
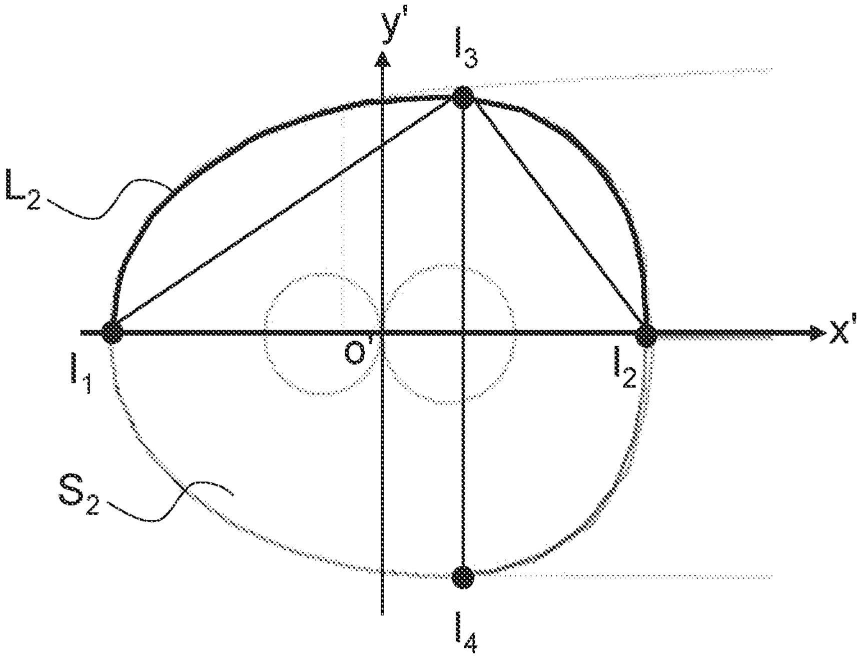
FIG. 14 is a schematic diagram illustrating an exemplary cross-section with the smallest area on an ear hook according to some embodiments of the present disclosure.

FIG. 14 is a schematic diagram illustrating an exemplary cross-section with the smallest area on an ear hook according to some embodiments of the present disclosure. In some embodiments, the cross-section with the smallest area on the ear hook is a cross-section where the extremum point N of the ear hook is located, and a projection of the cross-section along the long-axis direction Y is an axisymmetric plane S2. It should be understood that an arc section between the ending point G2 and the upper vertex K corresponding to the transition section is different in size from the axisymmetric plane S2, but similar in shape.

As shown in FIG. 14, in some embodiments, a projected axisymmetric plane S2 of the smallest cross-section of the ear hook along the long-axis direction Y may have a shape with one end narrower and the other end wider (e.g., pear-shaped, egg-shaped, droplet, etc.). A narrower end of the axisymmetric plane S2 has a first end point I1, and a wider end of the axisymmetric plane S2 has a second end point I2. In the wearing state, the second end point I2 is closer to the auricle than the first end point I1, so that a region where the ear hook 12 is in contact with the user's ear is mainly a region corresponding to the wider end, thereby increasing a contact area between the part of the ear hook corresponding to the axisymmetric plane S2 and the user's auricle to enable the ear hook 12 to cooperate with the sound production component 11 to better clamp the ear of the user, thus improving the wearing stability and adjustability of the earphone 10.

In some embodiments, by setting a cross-sectional area of the axisymmetric plane S2, a clamping coefficient of the "clamping force lever" mentioned above may be adjusted, thereby improving the wearing stability and adjustability of the earphone 10. The clamping coefficient of the "clamping force lever" may be defined as a deformation tendency of the ear hook 12 based on a clamping fulcrum (i.e., the extremum point N of the ear hook). If the clamping coefficient mentioned above is too large, a clamping force may be too large during wearing, and the ear 100 of the user may have a strong sense of pressure, so as to make it difficult to adjust the wearing position after wearing, and cause the upper side surface US of the sound production component 11 to be attached to the upper edge of the auricular concha cavity 102, thus a gap between the sound production component 11 and the auricular concha cavity 102 is too small or a count is too few, leading to a poor effect on sound leakage reduction. If the clamping coefficient mentioned above is too small, it may not be stable enough for the ear hook 12 to be worn, the sound production component 11 may be easily separated from the auricle, and the gap between the sound production component 11 and the auricular concha cavity 102 may be too large, that is, the opening of the formed cavity-like entity is too large, leading to a poor sound effect.

In some embodiments, the clamping coefficient of the ear hook 12 based on the clamping fulcrum (i.e., the extremum point N of the ear hook) may be represented as a relationship between a pulling distance from the sound production component 11 to the ear hook 12 and a clamping force generated by the ear hook 12 for driving the sound production component 11 to close to the first part of the ear hook in the wearing state. It should be noted that the pulling distance from the sound production component 11 to the ear hook 12 may be a variation of a distance between the sound production component 11 and the ear hook 12 in the long-axis direction Y of the sound production component from the non-wearing state to the wearing state. A value of the clamping coefficient of the ear hook 12 based on the clamping fulcrum (i.e., the extremum point N of the ear hook) may be determined in the following exemplary manner. The ear hook 12 may be equivalent to a spring, and a relationship between a pulling distance of the spring and a clamping force is shown in a formula (1):

$$F=kx, \tag{1}$$

wherein F denotes the clamping force, k denotes the clamping coefficient, and x denotes the pulling distance.

Based on the formula (1) mentioned above, the clamping coefficient may be determined in the following manner: determining at least one set of clamping force and pulling distance by measuring clamping forces corresponding to different pulling distances through a tensioner; determining at least one intermediate clamping coefficient by substituting the at least one set of clamping force and corresponding pulling distance into the formula (1); and calculating and designating a mean value of the at least one intermediate clamping coefficient as the clamping coefficient. Alternatively, a clamping force may be determined by measuring the clamping force when pulling apart a pulling distance in a normal wearing state by the tensioner, and the clamping force and pulling distance are substituted into the formula (1) to determine the clamping coefficient.

If the cross-sectional area of the axisymmetric plane S2 is too small, the clamping coefficient of the ear hook 12 may be too small, and the clamping force provided by the ear hook 12 to the ear 100 may also be too small, which leads to poor wearing stability. In addition, if the cross-sectional area of the axisymmetric plane S2 is too small, a contact area between the ear hook 12 and the ear of the user may be too small when in the wearing state, causing a strong oppression sense (such as a pressure) on the ear of the user by the ear hook 12, which leads to poor wearing comfort of the earphone 10. If the cross-sectional area of the axisymmetric plane S2 is too large, the clamping coefficient of the ear hook 12 may be too large, and the clamping force provided by the ear hook 12 to the ear 100 may also be too large, which leads to poor adjustability after wearing. In addition, if the cross-sectional area of the axisymmetric plane S2 is too large, the ear hook 12 may interfere with or squeeze the ear of the user in the wearing state, which leads to the poor wearing comfort of the earphone 10.

In some embodiments, in order to make the earphone 10 have better wearing stability and adjustability, the cross-sectional area of the axisymmetric plane S2 may be within a range of 5 $mm^2$-9 $mm^2$. In some embodiments, in order to further improve the wearing stability, the cross-sectional area of the axisymmetric plane S2 may be within a range of 6 $mm^2$-8 $mm^2$. In some embodiments, in order to further improve the adjustability, the cross-sectional area of the axisymmetric plane S2 may be within a range of 6.5 mm 2-7.5 $mm^2$.

In some embodiments, two points with the largest distance in any direction may be determined on an outer contour of the axisymmetric plane S2, and a long-axis of the axisymmetric plane S2 may be determined through the two points. In some embodiments, a distance between the first end point I1 and the second end point I2 of the axisymmetric plane S2 is the largest. The long-axis of the axisymmetric plane S2 is a connection line I1I2 connecting the first end point I1 and the second end point I2.

In some embodiments, in a direction perpendicular to the long-axis I1I2, the two points (i.e., point I3 and point I4) with the largest distance may be determined on the outer contour of the axisymmetric plane S2. Thus, a connection line I3I4 between point I3 and point I4 is a short-axis of the axisymmetric plane S2, and the connection line I1I2 is perpendicular to the connection line I3I4.

In some embodiments, the cross-sectional area of the axisymmetric plane S2 is determined by lengths of the long-axis I1I2 and the short-axis I3I4. If the lengths of the long-axis I1I2 and the short-axis I3I4 are too large, the cross-sectional area of the axisymmetric plane S2 may be too large, causing the clamping coefficient of the ear hook 12 to be excessively large, thus the clamping force provided by the ear hook 12 to the ear 100 is too large, which leads to the poor adjustability after wearing. At the same time, the ear hook 12 may interfere with or squeeze the ear of the user in the wearing state, which leads to the poor wearing comfort of the earphone 10. If the lengths of the long-axis I1I2 and the short-axis I3I4 are too small, the cross-sectional area of the axisymmetric plane S2 may be too small, causing the clamping coefficient of the ear hook 12 to be too small, thus the clamping force provided by the ear hook 12 to the ear 100 is too small, which leads to the poor wearing stability. At the same time, the contact area between the ear hook 12 and the ear of the user is too small in the wearing state, thus the oppression sense (such as the pressure) of the ear hook 12 on the ear of the user is relatively strong, which leads to poor wearing comfort of the earphone 10.

In some embodiments, in order to make the earphone 10 have better wearing stability and adjustability, the length of the long-axis I1I2 may be within a range of 2 mm-5 mm. In some embodiments, in order to further improve the wearing stability, the length of the long-axis I1I2 may be within a range of 2.5 mm-4 mm. In some embodiments, in order to further improve the adjustability, the length of the long-axis I1I2 may be within a range of 3 mm-4.5 mm.

Further, when the length of the long-axis I1I2 remains unchanged, the length of the short-axis I3I4 also determines the size and shape of the wider end of the axisymmetric plane S2, and the ear hook is mainly in contact with the ear of the user at the wider end. Therefore, if the length of the short-axis I3I4 is too small, the contact area between the ear hook and the ear of the user may be too small, thus the ear hook may provide a strong oppression sense (such as a pressure) on the ear of the user, and the earphone 10 may not be worn stably. If the length of the short-axis I3I4 is too large, the contact area between the ear hook and the ear of the user may be too large, thus the ear hook may interfere with or squeeze the ear of the user in the wearing state, which may affect the adjustability of the earphone 10.

In some embodiments, in order to make the earphone 10 have better wearing stability and adjustability, the length of the short-axis I3I4 may be within a range of 1.5 mm-4.5 mm. In some embodiments, in order to further improve the wearing stability, the length of the short-axis I3I4 may be within a range of 2 mm-4 mm. In some embodiments, in order to further improve the adjustability, the length of the short-axis I3I4 may be within a range of 2.5 mm-3 mm.

As shown in FIG. 14, in some embodiments, to establish a second rectangular coordinate system x'o'y', a direction of the long-axis I1I2 of the axisymmetric plane S2 may be designated as an abscissa axis, i.e., an x'-axis, a direction perpendicular to the long-axis I1I2 (i.e., a direction of the short-axis I3I4) may be designated as a coordinate axis, i.e., a y'-axis, and an intersection of the x'-axis and the y'-axis is designated as an origin o'.

In some embodiments, the long-axis I1I2 of the axisymmetric plane S2 may be a symmetry axis of the axisymmetric plane S2, and outer contour curves of two half-planes on both sides of the long-axis I1I2 of the axisymmetric plane S2 are the same. In some embodiments, an outer contour curve of a half-plane on one side (e.g., an upper side or a lower side) of the long-axis I1I2 (i.e., the symmetry axis) is defined as a second curve L2. In some embodiments, two end points of the second curve L2 (such as the first end point I1 and the second end point I2) may be two end points of the long-axis I1I2 (such as the first end point I1 and the second end point I2), the second curve L2 is the outer contour (e.g., an outer contour on each side of the long-axis I1I2) of the axisymmetric plane S2 between the two end points of the long-axis I1I2. In some embodiments, the second curve L2 has an extremum point in a direction perpendicular to the long-axis I1I2 (i.e., a direction of the y'-axis). In some embodiments, since the short-axis I3I4 has the largest length in the direction perpendicular to the long-axis I1I2, and the axisymmetric plane S2 is symmetrical about the long-axis I1I2, on one side (the upper side or the lower side) of the long-axis I1I2, a point on the outer contour of the axisymmetric plane S2 with the largest distance from the long-axis I1I2 is an end point of the short-axis I3I4. According to the definition of the extremum point, the second curve L2 corresponding to the outer contour curve of the half-plane located on one side (such as the upper side or the lower side) of the long-axis I1I2 (i.e., the symmetry axis) may be determined, and the extremum point is the end point of the short-axis I3I4 on the side corresponding to the long-axis I1I2. For example, if an outer contour curve of a half-plane located on the upper side of the long-axis I1I2 (i.e., the symmetry axis) is designated as the second curve L2, and an extremum point of which is an end point I3 of the short-axis I3I4 on the upper side of the long-axis I1I2.

In some embodiments, in the wearing state, in the long-axis I1I2 direction, the extremum point (I3 or I4) of the second curve L2 is closer to the second end point I2 than the first end point I1, thus one end of the axisymmetric plane S2 close to the second end point I2 is wider, and one end of the axisymmetric plane S2 close to the first end point I1 is narrower. Since the second end point I2 is closer to the auricle, a region on the ear hook that is in contact with the user is a region corresponding to a wider end close to the second end point I2, thereby increasing the contact area between the ear hook and the user and avoiding the strong oppression sense (e.g., a pressure) of the ear hook on the ear of the user, which improves the wearing stability of the earphone 10.

In some embodiments, in the long-axis I1I2 direction, a ratio of a distance between the extremum point (e.g., the extremum point I3) and the first end point I1 to a distance between the extremum point (e.g., the extremum point I3) and the second end point I2 determines a shape and a size of the wider end of the axisymmetric plane S2 near the second end point I2, thereby affecting the contact area between the ear hook and the ear of the user. If the ratio of the distance between the extremum point (e.g., the extremum point I3) and the first end point I1 to the distance between the extremum point (e.g., the extremum point I3) and the second end point I2 is too large in the direction of the long-axis I1I2, and the extremum point I3 is too close to the second end point I2, that is, the short-axis I3I4 is too close to the second end point I2, a size of the wider end close to the second end point I2 on the axisymmetric plane S2 may be too large. Thus, the contact area between the ear hook and the ear of the user is too large, and the ear hook may interfere with the ear of the user in the wearing state, which may affect the adjustability of the earphone 10. If the ratio of the distance between the extremum point (e.g., the extremum point I3) and the first end point I1 to the distance between the extremum point (e.g., the extremum point I3) and the second end point I2 is too small in the direction of the long-axis I1I2, and the extremum point I3 is too far to the second end point I2, that is, the short-axis I3I4 is too far to the second end point I2, a size of the wider end close to the second end point I2 on the axisymmetric plane S2 may be too small. Thus, the contact area between the ear hook and the ear of the user is too small, the oppression sense (e.g., the pressure) of the ear hook on the ear of the user is relatively strong, which may cause the earphone 10 not to be worn stably.

Figure 15:
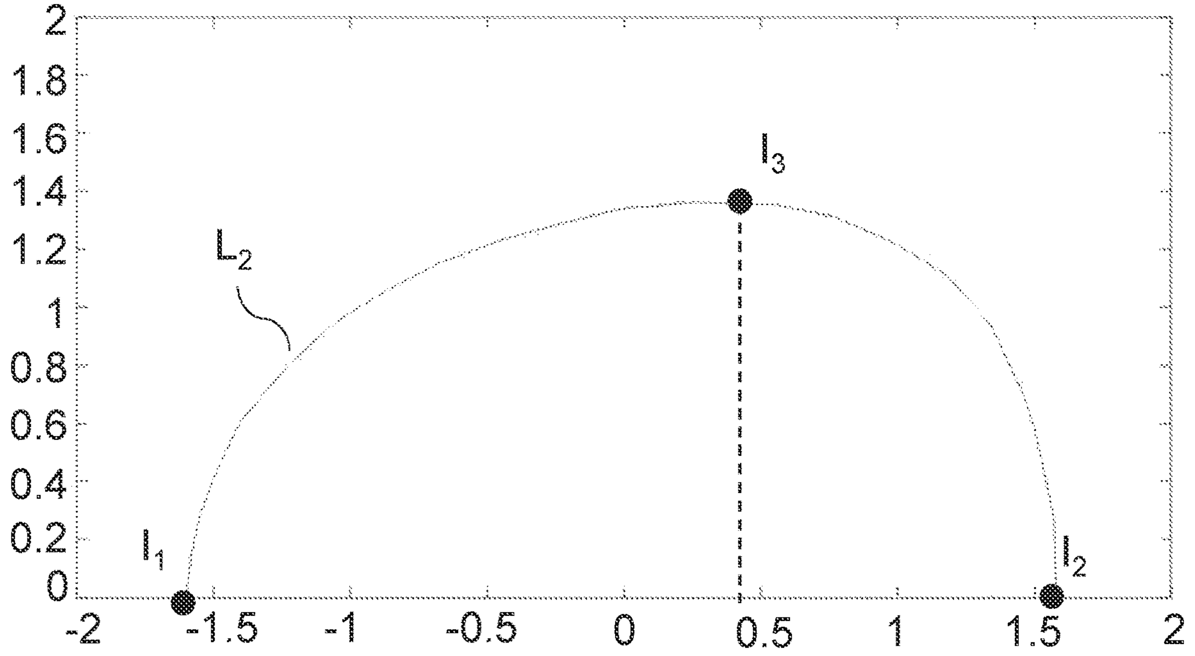
FIG. 15 is a schematic diagram illustrating an exemplary fitting function curve of a second curve according to some embodiments of the present disclosure.

In some embodiments, in order to improve the wearing stability of the earphone 10, in the long-axis I1I2 direction (i.e., in the x'-axis direction), a ratio of a distance between an extremum point (e.g., the extremum point I3) of the outer contour curve (i.e., a third curve L3) and the first end point I1 of the outer contour curve to a distance between the extremum point (e.g. extremum point I3) of the outer contour curve and the second end point I2 of the outer contour curve may be within a range of 1.5-2.5. That is, as shown in FIG. 15, in the second rectangular coordinate system x'o'y', a ratio of an absolute value of a difference between an abscissa of point I3 and an abscissa of point I1 to an absolute value of a difference between the abscissa of point I3 and an abscissa point I2 may be within a range of 1.5-2.5. In some embodiments, in order to further improve the wearing stability, the ratio of the distance between the extremum point (e.g., the extremum point I3) and the first end point I1 to the distance between the extremum point (e.g., the extremum point I3) and the second end point I2 in the direction of the long-axis I1I2 may be within a range of 1.8-2.2. In some embodiments, in order to further improve the adjustability, the ratio of the distance between the extremum point (e.g., the extremum point I3) and the first end point I1 to the distance between the extremum point (e.g., the extremum point I3) and the second end point I2 in the direction of the long-axis I1I2 may be within a range of 1.9-2.1.

In summary, by designing a position of the extremum point (e.g., the extremum point I3) of the outer contour curve (i.e., the second curve L2), a contact area between the ear hook 12 and the auricle of the user may be adjusted when the earphone 10 is in the wearing state, thereby improving the wearing stability and adjustability of the earphone 10.

FIG. 15 is a schematic diagram illustrating an exemplary fitting function curve of a second curve according to some embodiments of the present disclosure. As shown in FIG. 14 and FIG. 15. In some embodiments, an extremum point (e.g., the extremum point I3) of the second curve L2 may be determined by curve fitting. Merely by way of example, the x'-axis of the coordinate system x'o'y' is set at a position of the long-axis I1I2 of the axisymmetric plane S2, the origin o' is set at a midpoint of the long-axis I1I2, and the y'-axis is set at a position passing through the origin o' and perpendicular to the x'-axis.

In the second rectangular coordinate system x'o'y', the second curve L2 is fitted by a quaternary polynomial function to obtain a fitting function equation of the second curve L2:

$$t=-0.3923*s^{\wedge}4-0.1377*s^{\wedge}3+0.0112*s^{\wedge}2+0.2297*s+1.318 \quad \text{(Equation 4)}.$$

In some embodiments, it may be determined by equation 4 that the second curve L2 has two zero points, which correspond to the first end point I1 and the second end point I2 respectively. In some embodiments, the coordinates of the first end point I1 are (−1.375, 0), and the coordinates of the second end point I2 are (1.375, 0).

It should be noted that a function equation (e.g., equation 4) of the second curve L2 obtained by polynomial fitting is an approximate expression of the second curve L2. When a count of sampling points for fitting the function equation is large (e.g., greater than 10) and evenly distributed, a curve represented by the function equation may be considered as the second curve L2. The function equation fitted in the present disclosure is only an example, mainly used to describe a feature of the second curve L2 (including an extremum point, an inflection point, a first derivative, a second derivative, etc.), a specific function equation of the second curve L2 (e.g., equation 4) is related to the selection of the origin o' of the coordinate system x'o'y', and the function equation is different when the origin o' is different. However, in the case of a direction of a horizontal axis (x'-axis) and a direction of a vertical axis (y'-axis) of the coordinate system remaining unchanged, a position of the extremum point of the second curve L2 on the second curve L2 is certain, and properties of the first derivative and the second derivative of the second curve L2 are also certain, which do not change with a position of the origin o' of the coordinate system x'o'y'. The present disclosure is non-limiting to the selection of the origin o' of the coordinate system x'o'y' for fitting the second curve L2 and the function equation of the second curve L2.

In some embodiments, the second curve L2 has one and only one extremum point, and the extremum point is the maximum point I3 and the corresponding coordinates are (0.4599, 1.3951).

In some embodiments, more descriptions regarding determining the extremum point of the second curve L2 may be found in related descriptions regarding the extremum point of the first curve L1, which may not be repeated here.

Figure 16:
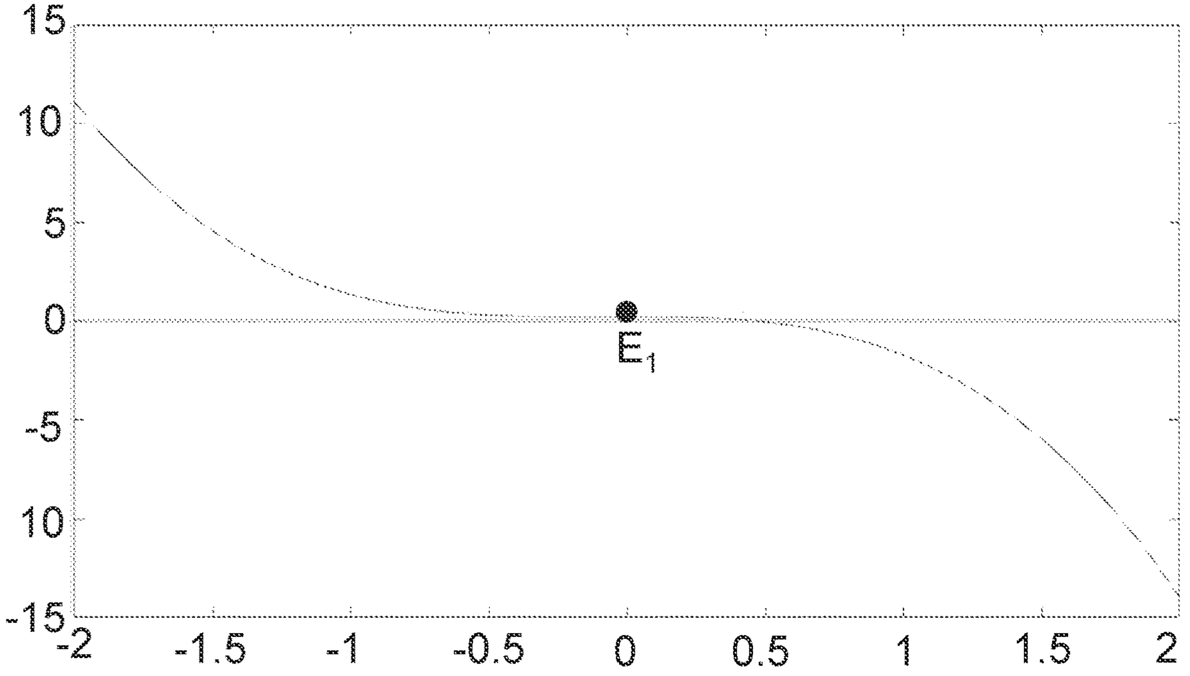
FIG. 16 is a schematic diagram illustrating an exemplary first derivative curve of a fitting curve according to some embodiments of the present disclosure.

FIG. 16 is a schematic diagram illustrating an exemplary first derivative curve of a fitting curve according to some embodiments of the present disclosure. As shown in FIG. 16, in some embodiments, in the second rectangular coordinate system x'o'y', the second curve L2 has a first derivative:

$$t'=-1.5692*s^{\wedge}3-0.4131*s^{\wedge}2+0.0224*s+0.2297 \quad \text{(Equation 5)}.$$

In some embodiments, the first derivative of the second curve L2 is continuous.

In some embodiments, in the second rectangular coordinate system x'o'y', the first derivative of the second curve L2 has one or more inflection points. In some embodiments, in the second rectangular coordinate system x'o'y', the first derivative of the second curve L2 has one inflection point, i.e., point E1. As shown in FIG. 16, on the left side of point E1, an image curve of the first derivative is a concave function, and on the right side of point E1, the image curve of the first derivative is a convex function. Point E1 is a change point of the concavity and convexity of the image curve of the first derivative and is the inflection point of the first derivative. More descriptions regarding determining the inflection point may be found in FIGS. 7-9 and related descriptions thereof, which may not be repeated here.

In some embodiments, in the second rectangular coordinate system x'o'y', the first derivative of the second curve L2 has a zero point (0.4559, 0).

In some embodiments, in the second rectangular coordinate system x'o'y', the first derivative of the second curve L2 has two extremum points, and the corresponding abscissas are x1=0.1994, and x2=−0.0239.

Figure 17:
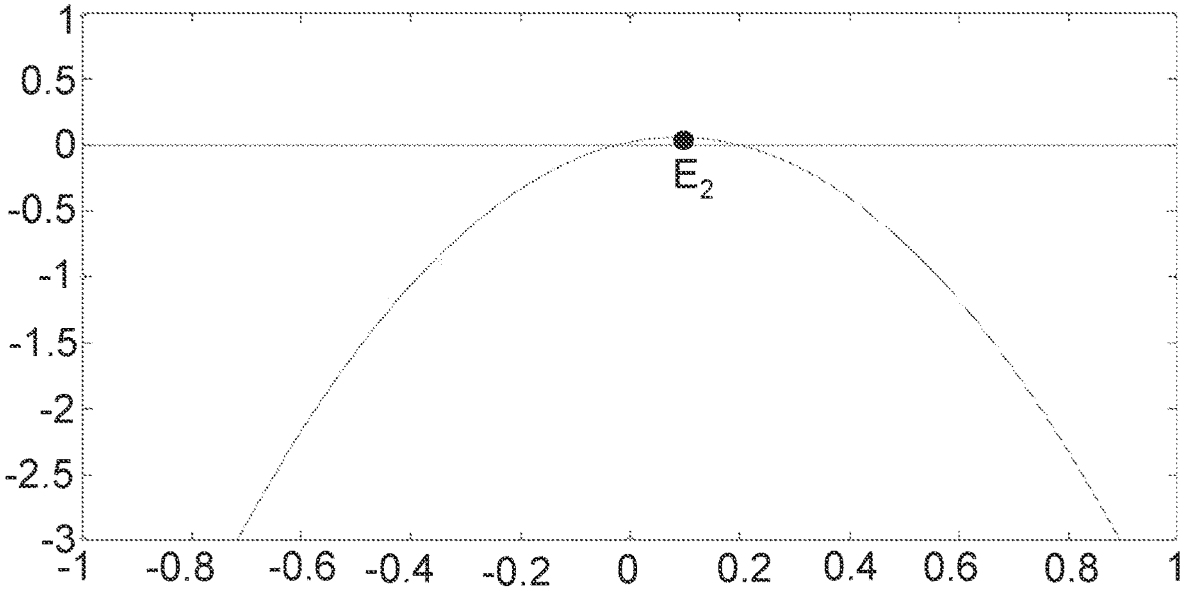
FIG. 17 is a schematic diagram illustrating an exemplary second derivative curve of a fitting curve according to some embodiments of the present disclosure.

FIG. 17 is a schematic diagram illustrating an exemplary second derivative curve of a fitting curve according to some embodiments of the present disclosure. As shown in FIG. 17, in some embodiments, the second curve L2 has a second derivative:

$$t''=-4.7076*s^{\wedge}2-0.8262*s+0.0224 \quad \text{(Equation 6)}.$$

In some embodiments, the second derivative of the second curve L2 is continuous.

In some embodiments, in the second rectangular coordinate system x'o'y', the second derivative of a fitting curve L4 of a third curve L3 has a maximum point, i.e., point E2. As shown in FIG. 17, curves of the second derivative of the fitting curve L4 on the left side and the right side near point E2 are all located below point E2, that is, in a region on the left side and the right side near point E2, a function value of the second derivative corresponding to point E2 is the largest, and point E2 is the maximum point of the second derivative.

In some embodiments, the coordinates of the maximum point E2 of the second derivative are (−0.08775, 0.0587). In some embodiments, descriptions regarding determining the coordinates of the maximum point E2 of the second derivative may be found in the related descriptions regarding the maximum point of the first curve L1, which may not be repeated here.

In some embodiments, by designing the second curve L2 (equation 4), the first derivative of the second curve L2 (equation 5), and the second derivative of the second curve L2 (equation 6), the ear hook 12 may have a cross-section with a preset shape (an outer contour curve with a preset curve feature) at the extremum point N' of the first curve L1, thereby increasing a contact area between the ear hook 12 and the user's ear in the wearing state. Thus, the ear hook 12 may cooperate with the sound production component 11 to better clamp the ear of the user, and the wearing stability and adjustability of the earphone 10 can be improved.

The basic concept has been described above, obviously, for those skilled in the art, the above detailed disclosure is only an example and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of the present disclosure.

Moreover, certain terminology has been used to describe embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "an embodiment" "an embodiment" or "an alternative embodiment" in different places in the present disclosure do not necessarily refer to the same embodiment. In addition, some features, structures, or features in the present disclosure of one or more embodiments may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, the present disclosure does not mean that the present disclosure object requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the present disclosure are to be understood as being modified in some instances by the term "about," "approximate," or "substantially." Unless otherwise stated, "about", "approximately" or "substantially" indicates that the stated figure allows for a variation of ±20%. Accordingly, in some embodiments, the numerical parameters used in the present disclosure and claims are approximations that can vary depending on the desired characteristics of individual embodiments. In some embodiments, numerical parameters should take into account the specified significant digits and adopt the general digit reservation method. Although the numerical ranges and parameters used in some embodiments of the present disclosure to confirm the breadth of the scope are approximate values, in specific embodiments, such numerical values are set as precisely as practicable.

The entire contents of each patent, patent application, patent application publication, and other material, such as article, book, specification, publication, document, etc., cited in the present disclosure are hereby incorporated by reference into the present disclosure. Application history documents that are inconsistent with or conflict with the content of the present disclosure are excluded, as are documents (currently or hereafter appended to the present disclosure) that limit the broadest scope of the claims of the present disclosure. It should be noted that if there is any inconsistency or conflict between the descriptions, definitions, and/or terms used in the attached materials of the present disclosure and the contents of the present disclosure, the descriptions, definitions, and/or terms used in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An earphone, comprising:

a sound production component including a transducer and a housing for accommodating the transducer; and an ear hook, wherein in a wearing state, a first part of the ear hook is hung between an auricle and a head of a user, and a second part of the ear hook extends towards a side of the auricle away from the head and connects to the sound production component to place the sound production component at a position near an ear canal but not blocking the ear canal, wherein:

the sound production component has an outer side surface facing away from the auricle, an included angle between the outer side surface of the sound production component and an ear hook plane defined by the ear hook is within a range of 15°-25°.

2. The earphone of claim 1, wherein the sound production component has an inner side surface facing the auricle, a vertical distance between a point on the ear hook with a farthest vertical distance from the inner side surface of the sound production component and the inner side surface of the sound production component is within a range of 6 mm-9 mm.

3. The earphone of claim 1, wherein:

an inner contour of a projection of the ear hook on the user's sagittal plane includes a first curve, the first curve has an extremum point in a first direction, and the first direction is perpendicular to a long-axis direction of a projection of the sound production component; and the extremum point is located behind a projection point of an upper vertex of the ear hook on the user's sagittal plane, and the upper vertex of the ear hook is the highest point of an inner contour of the ear hook along a vertical axis of the user in the wearing state.

4. The earphone of claim 3, wherein a distance between the extremum point and the projection point of the upper vertex of the ear hook on the user's sagittal plane is within a range of 6 mm-5 mm along the long-axis direction of the projection of the sound production component.

5. The earphone of claim 3, wherein a distance between the extremum point and a projection point of the centroid of the earphone on the user's sagittal plane is within a range of 20 mm-35 mm.

6. The earphone of claim 3, wherein a first included angle between a connection line connecting the extremum point and a projection point of the centroid of the earphone on the user's sagittal plane and the long-axis direction of the projection of the sound production component is within a range of 60°-80°.

7. The earphone of claim 3, wherein a distance between the extremum point and a projection of the centroid of the sound production component on the user's sagittal plane is within a range of 20 mm-30 mm.

8. The earphone of claim 3, wherein a second included angle between a connection line connecting the extremum point and a projection point of the centroid of the sound production component on the user's sagittal plane and the long-axis direction of the projection of the sound production component is within a range of 65°-85°.

9. The earphone of claim 3, wherein a first included angle between a connection line connecting the extremum point and a projection point of the centroid of the earphone on the user's sagittal plane and the long-axis direction of the projection of the sound production component is smaller than a second included angle between a connection line connecting the extremum point and a projection point of the centroid of the sound production component on the user's sagittal plane and the long-axis direction of the projection of the sound production component.

10. The earphone of claim 3, wherein an included angle between a connection line connecting a corresponding point of the extremum point on the ear hook and the centroid of the sound production component and the ear hook plane is within a range of 10°-18°.

11. The earphone of claim 3, wherein a distance between the projection point of the upper vertex of the ear hook on the user's sagittal plane and a projection point of the centroid of the earphone on the user's sagittal plane is within a range of 22 mm-35 mm.

12. The earphone of claim 3, wherein an included angle between a connection line connecting a projection point of the centroid of the earphone on the user's sagittal plane and the projection point of the upper vertex of the ear hook on the user's sagittal plane and the long-axis direction of the projection of the sound production component is within a range of 35°-60°.

13. The earphone of claim 3, wherein a first derivative of the first curve in a first preset coordinate system is continuous, a vertical axis of the first preset coordinate system is parallel to the first direction, and a horizontal axis of the first preset coordinate system is parallel to the long-axis direction of the projection of the sound production component.

14. The earphone of claim 13, wherein the first derivative of the first curve in the first preset coordinate system has one or more inflection points.

15. The earphone of claim 14, wherein a count of the one or more inflection points is one.

16. The earphone of claim 14, wherein both sides of each of the one or more inflection points respectively have extremum points.

17. The earphone of claim 13, wherein a second derivative of the first curve in the first preset coordinate system is continuous.

18. The earphone of claim 17, wherein the second derivative of the first curve in the first preset coordinate system has a maximum point.

19. The earphone of claim 1, wherein the first part of the ear hook includes a transition section and a battery compartment, one end of the transition section is connected to the battery compartment, and a cross-sectional area of the transition section is larger than 17.99 $mm^2$.

20. The earphone of claim 19, wherein in a non-wearing state, an included angle between a connection line connecting a starting point of an inner curve of a projection of the transition section on an ear hook plane and a projection point of the extremum point on the user's sagittal plane and a connection line connecting a starting point of the projection of the transition section on the user's sagittal plane and the projection point of the upper vertex of the ear hook on the user's sagittal plane is within a range of 20°-24°.

* * * * *